US012639060B2

(12) United States Patent
Sasaki et al.

(10) Patent No.: US 12,639,060 B2
(45) Date of Patent: May 26, 2026

(54) INFORMATION PROCESSING APPARATUS THAT ALLOWS AUTOMATIC UPDATING OF FIRMWARE WHEN THE APPARATUS IS A TARGET OF A PREDETERMINED SUBSCRIPTION SERVICE, CONTROL METHOD, AND STORAGE MEDIUM

(71) Applicant: CANON KABUSHIKI KAISHA, Tokyo (JP)

(72) Inventors: Gou Sasaki, Kanagawa (JP); Ryuhei Wakita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 18/416,959

(22) Filed: Jan. 19, 2024

(65) Prior Publication Data

US 2024/0256257 A1 Aug. 1, 2024

(30) Foreign Application Priority Data

Jan. 30, 2023 (JP) ................................. 2023-012104
Sep. 14, 2023 (JP) ................................. 2023-149206

(51) Int. Cl.
G06F 8/65 (2018.01)
G06F 3/12 (2006.01)

(52) U.S. Cl.
CPC .............. G06F 8/65 (2013.01); G06F 3/1204 (2013.01); G06F 3/123 (2013.01); G06F 3/1258 (2013.01)

(58) Field of Classification Search
CPC .......... G06F 8/65; G06F 3/1204; G06F 3/123; G06F 3/1258
See application file for complete search history.

(56) References Cited

U.S. PATENT DOCUMENTS 9,244,675 B2 * 1/2016 Tsuji ...................... G06F 1/3284
9,317,281 B2 * 4/2016 Niwa ....................... G06F 8/654
(Continued)

FOREIGN PATENT DOCUMENTS

EP 0811942 A2 * 12/1997 .............. H04L 9/40
JP 2022085782 A 6/2022

OTHER PUBLICATIONS

Extended European Search Report issued Jun. 21, 2024 in counterpart European Patent Appln. No. 24153309.0.

*Primary Examiner* — Daxin Wu
(74) *Attorney, Agent, or Firm* — Venable LLP

(57) ABSTRACT

An information processing apparatus capable of automatically updating a predetermined program more securely than before is provided. The information processing apparatus comprises a storage unit capable of storing a predetermined program, a communication control unit capable of communicating with an external apparatus mutually; an automatic updating unit capable of, in a case where a most recent program corresponding to the predetermined program is stored in the external apparatus, automatically updating the predetermined program to the most recent program by receiving the most recent program from the external apparatus, and a setting unit configured to perform setting for activating or deactivating the automatic updating unit. In a case where the information processing apparatus is a target of a predetermined service, the automatic updating unit is in an activated state and the setting unit does not perform setting for activating and deactivating the automatic updating unit.

16 Claims, 14 Drawing Sheets

(56)            References Cited

U.S. PATENT DOCUMENTS

| | | | | |
|---|---|---|---|---|
| 10,185,508 B1 * | 1/2019 | Farhan | | G06F 8/654 |
| 2009/0187900 A1 * | 7/2009 | Nakamoto | | G06F 8/65 |
| | | | | 717/168 |
| 2013/0332914 A1 * | 12/2013 | Goda | | G06F 8/65 |
| | | | | 717/168 |
| 2014/0115572 A1 * | 4/2014 | Michishita | | G06F 8/65 |
| | | | | 717/168 |
| 2015/0007157 A1 * | 1/2015 | Park | | G06F 8/65 |
| | | | | 717/170 |
| 2016/0162281 A1 * | 6/2016 | Hokiyama | | G06F 8/65 |
| | | | | 717/173 |
| 2017/0078922 A1 * | 3/2017 | Raleigh | | H04L 69/18 |
| 2019/0265963 A1 * | 8/2019 | Watanabe | | G06F 8/65 |
| 2020/0241871 A1 * | 7/2020 | Sharma | | G06F 8/71 |
| 2020/0304626 A1 * | 9/2020 | Phillips | | G06Q 20/18 |
| 2022/0303381 A1 * | 9/2022 | Phillips | | G06Q 30/0641 |
| 2024/0272894 A1 * | 8/2024 | Green | | B60L 58/10 |

* cited by examiner

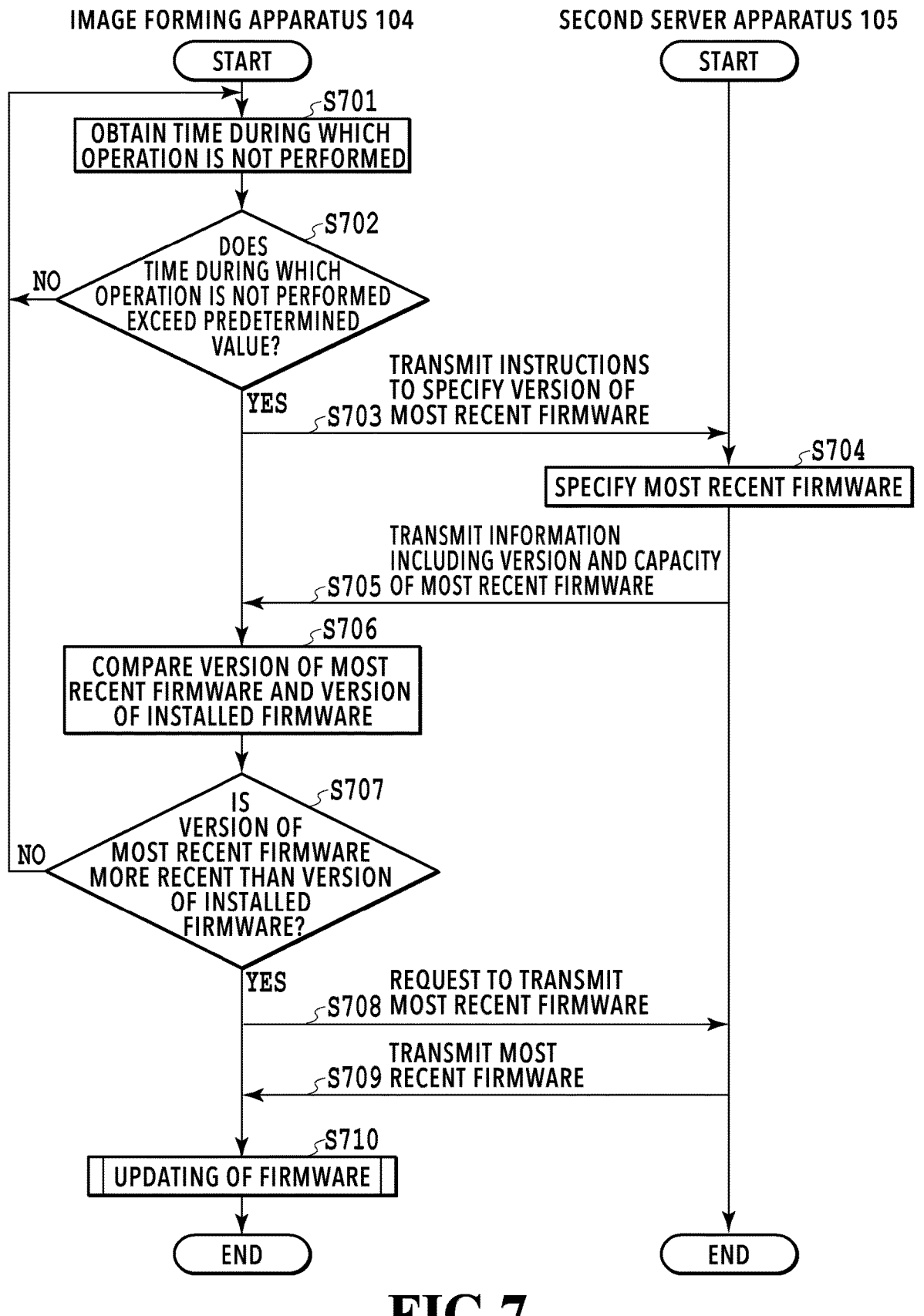

IMAGE FORMING APPARATUS 104

START

S701
OBTAIN TIME DURING WHICH
OPERATION IS NOT PERFORMED

S702
DOES
TIME DURING WHICH
OPERATION IS NOT PERFORMED
EXCEED PREDETERMINED
VALUE?

NO

YES

S703 TRANSMIT INSTRUCTIONS TO SPECIFY VERSION OF MOST RECENT FIRMWARE

S705 TRANSMIT INFORMATION INCLUDING VERSION AND CAPACITY OF MOST RECENT FIRMWARE

S706
COMPARE VERSION OF MOST
RECENT FIRMWARE AND VERSION
OF INSTALLED FIRMWARE

S707
IS
VERSION OF
MOST RECENT FIRMWARE
MORE RECENT THAN VERSION
OF INSTALLED
FIRMWARE?

NO

YES

S708 REQUEST TO TRANSMIT MOST RECENT FIRMWARE

S709 TRANSMIT MOST RECENT FIRMWARE

S710
UPDATING OF FIRMWARE

END

SECOND SERVER APPARATUS 105

START

S704
SPECIFY MOST RECENT FIRMWARE

END

FIG.7

INFORMATION PROCESSING APPARATUS THAT ALLOWS AUTOMATIC UPDATING OF FIRMWARE WHEN THE APPARATUS IS A TARGET OF A PREDETERMINED SUBSCRIPTION SERVICE, CONTROL METHOD, AND STORAGE MEDIUM

BACKGROUND

Field of the Invention

The present invention relates to an information processing apparatus, a control method, and a storage medium.

Description of the Related Art

Japanese Patent Laid-Open No. 2022-85782 has disclosed a communication device for which it is possible for a user to arbitrarily set whether to activate or deactivate a function to automatically update an installed predetermined program (also referred to as automatic updating function).

It may be possible for a user who desires automatic updating of a predetermined program to set the communication device so that the above-described automatic updating function is activated. On the other hand, it may be possible for a user who desires to update a predetermined program at his/her discretion to set the communication device so that the above-described automatic updating function is deactivated.

With the communication device (also referred to as information processing apparatus) of Japanese Patent Laid-Open No. 2022-85782, in a case where the above-described automatic updating function is deactivated, it becomes difficult to automatically update a predetermined program.

Incidentally, in recent years, a flat-rate service (so-called subscription service) enabling a user to utilize a predetermined product for a predetermined period of time by paying a predetermined subscription fee has spread.

In a case where a predetermined program is installed in the flat-rate service-target product, it is preferable for the predetermined program to be updated automatically. The reason is to make it possible for a user to receive the provision of the most recent and preferred flat-rate service.

However, in a case where a user utilizes the communication device as in Japanese Patent Laid-Open No. 2022-85782 as the flat-rate service target, on a condition that the automatic updating function of the predetermined program is deactivated, it is made difficult for a user to receive the provision of the most recent and preferred flat-rate service.

SUMMARY

Consequently, an object of the present invention is to provide an information processing apparatus capable of automatically updating a predetermined program more securely than before.

The information processing apparatus according to the present invention is an information processing apparatus including: a storage unit capable of storing a predetermined program; a communication control unit capable of communicating with an external apparatus mutually; an automatic updating unit capable of, in a case where a most recent program corresponding to the predetermined program is stored in the external apparatus, automatically updating the predetermined program to the most recent program by receiving the most recent program from the external apparatus; and a setting unit configured to perform setting for activating or deactivating the automatic updating unit, wherein in a case where the information processing apparatus is a target of a predetermined service, the automatic updating unit is an activated state and the setting unit does not perform setting for activating or deactivating the automatic updating unit.

Further features of the present invention will become apparent from the following description of exemplary embodiments with reference to the attached drawings.

BRIEF DESCRIPTION OF THE DRAWINGS

FIG. 7 is a flowchart showing one example of processing to be performed by the image forming apparatus and the second server apparatus in one embodiment;

DESCRIPTION OF THE EMBODIMENTS

Figure 1:
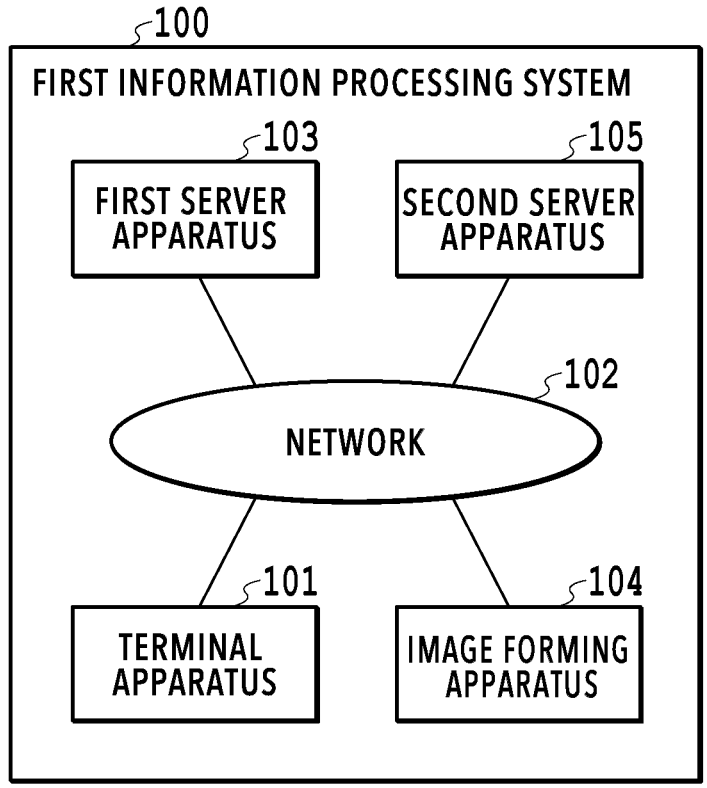
FIG. 1 is a schematic diagram showing a configuration of a whole system of an information processing system in one embodiment.

In the following, with reference to the attached drawings, preferred embodiments of the present invention are explained in detail. The following embodiments are not intended to limit the scope of the claims. Further, all combinations of features explained in the present embodiments are not necessarily indispensable to the solution of the present invention.

First Embodiment

<Flat-Rate Service>

In the present specification, the flat-rate service means a service enabling a user to utilize a predetermined product for a predetermined period of time by the user paying a predetermined subscription fee to the service provider providing the flat-rate service. For example, by a user paying a predetermined subscription fee to the service provider monthly, it is possible for the user to utilize the product corresponding to the subscription fee for one month. Of course, consumables corresponding to the product may be provided periodically during the period of time of the contact of the flat-rate service. That is, the flat-rate service of the present embodiment is a so-called subscription service.

In the present embodiment, explanation is given by supposing a case where the product that is lent to a user by the service provider as the target of the flat-rate service is an image forming apparatus. As long as it is possible for the service provider to provide a product to a user, the example of the product is not limited to the image forming apparatus. Further, in the present embodiment, explanation is given by supposing a case where the consumable to be provided as the target of the flat-rate service is a printing medium (for example, paper) that can be used for the image forming apparatus or a printing material (for example, ink), or both. As long as it is possible for the service provider provide a consumable to a user, the example of the consumable is not limited to the printing medium, the printing material or the like.

In the present embodiment, as the contract contents of the fixed-rate service, the service lending the image forming apparatus alone and the service lending the image forming apparatus and at the same time providing consumables are considered. Consumables may be provided periodically or provided at timing at which the remaining amount of consumables becomes a predetermined value or less.

Specifically, in a case where a user subscribes to the flat-rate service, the image forming apparatus is delivered to the user. It is possible for the user having received the image forming apparatus to perform printing by utilizing the image forming apparatus until the number of sheets determined by the contract is reached within the period of time determined by the contract. In a case where there is a possibility that the number of printed sheets reaches the number of sheets determined by the contract, it may also be possible for the user to change the contract contents to a plan enabling printing of a larger number of sheets. Alternatively, in a case where the number of printed sheets exceeds the number of sheets determined by the contract, it may also be possible for the service provider to charge an additional fee for each sheet.

In a case where a user withdraws from the flat-rate service, it is necessary for the user to return the image forming apparatus lent to the user to the service provider. Further, in a case where there exists an option to purchase the image forming apparatus that the user has utilized by the flat-rate service to take possession of the image forming apparatus, it is not necessary for the user to return the image forming apparatus. It may also be possible to configure the information processing system in the present embodiment so that it is made possible for a user continuously utilize the image forming apparatus lent to the user by performing processing necessary to switch return to purchase.

<Configuration of Whole System>

FIG. 1 is a schematic diagram showing the configuration of the whole system of an information processing system in the present embodiment.

As shown in FIG. 1, a first information processing system 100 is configured by including a terminal apparatus 101, a network 102, a first server apparatus 103, an image forming apparatus 104, and a second server apparatus 105. The terminal apparatus 101, the first server apparatus 103, the image forming apparatus 104, and the second server apparatus 105 are capable of communicating with one another via the network 102.

Information necessary in a case where a user asks the service provider subscription to or withdrawal from the flat-rate service (return or purchase of the flat-rate service-target product) is input to the terminal apparatus 101. It is possible for the terminal apparatus 101 to transmit the input information to the first server apparatus 103 by receiving instructions of a user. For example, the terminal apparatus 101 is a smartphone or a personal computer used by a user.

In the following, information necessary for specifying a user, which the user has input in a case of asking subscription to the flat-rate service, is called "user information". As one example of "user information", there are a name, address and the like of a user, user ID, password and the like.

In a case where a user asks subscription to the flat-rate service, it is necessary to input the type of the flat-rate service-target product to the terminal apparatus 101. For example, to the terminal apparatus 101, contract contents relating to whether or not a user desires lending of the image forming apparatus 104 by the service provider are input.

It is possible for the first server apparatus 103 to receive "user information" transmitted from the terminal apparatus 101. In a case where subscription to the flat-rate service is admitted, as the flat-rate service target, for example, the image forming apparatus 104 is lent to the user. It is possible for the first server apparatus 103 to store identification information for uniquely specifying the flat-rate service-target image forming apparatus 104, user information on the user having subscribed to the flat-rate service, and the contract contents of the flat-rate service in association with one another. As one example of the identification information for uniquely specifying the image forming apparatus 104, there is a manufacturer's serial number or the like of the image forming apparatus 104. That is, the first server apparatus 103 is a management apparatus for managing information relating to the contract contents of the user having subscribed to the flat-rate service.

Further, in a case where withdrawal from the flat-rate service is admitted, the first server apparatus 103 breaks off the association of the identification information on the image forming apparatus 104, the user information on the user, and the contract contents of the flat-rate service, which have been associated with one another at the time of the subscription. That is, the contents of the flat-rate service that the user utilizes are updated to the contents after the withdrawal.

It is possible for the image forming apparatus 104 to form an image while ejecting a printing material to a printing medium. The image forming apparatus 104 in the present embodiment does not generally come onto the market but is an information processing apparatus capable of being taken as the target of the flat-rate service. However, in a case where a user withdraws from the flat-rate service and selects to purchase the image forming apparatus 104 lent to the user, it is also possible for the user to continuously utilize the image forming apparatus 104 like a general product on the market.

Further, the image forming apparatus 104 has the function to automatically update a predetermined program (in the following, called "automatic updating function" as appropriate). In the following, explanation is given by supposing a case where the predetermined program is firmware, but the example of the predetermined program is not limited to this. The image forming apparatus 104 of the present embodiment is configured so that the automatic updating function is activated whenever this is possible in the state where the image forming apparatus 104 is connected to the second server apparatus 105.

It is possible for the second server apparatus 105 to store a plurality of pieces of updating information different for each type or for each model type. The second server apparatus 105 stores information for updating the firmware of the image forming apparatus 104 (called "updating information") and information relating to the updating information.

In the present embodiment, the only one image forming apparatus 104 is shown schematically, but in actuality, it is supposed that an image forming apparatus other than the image forming apparatus 104 is connected to the network 102. The updating of the firmware is performed with updating information different for each image forming apparatus for each type or for each model type.

Further, in the present embodiment, explanation is given by supposing a case where the updating information is the most recent firmware itself. However, the updating information may not be the firmware itself but may be information for updating the firmware by modifying part of the firmware installed in the image forming apparatus 104, adding a program to the firmware, and so on. The image forming apparatus 104 having received the updating information updates the firmware by replacing the already installed firmware with the updating information. However, the updating of the firmware is not limited to this aspect.

In the present embodiment, a job log is transmitted periodically from the image forming apparatus 104 to the first server apparatus 103 via the network 102. Due to this, by using the first server apparatus 103 having received the job log, it is made possible to manage the state of the image forming apparatus 104, the remaining amount of the consumable used for the image forming apparatus 104, and the like. As one example of the state of the image forming apparatus 104, there is a version or the like of the firmware installed in the image forming apparatus 104.

Further, in a case where the most recent version of the firmware installed in the image forming apparatus 104 is stored in the second server apparatus 105, it is also made possible to transmit the most recent firmware to the image forming apparatus 104 from the second server apparatus 105.

In the present embodiment, in a case of performing printing, the image forming apparatus 104 creates a job log including the number of printed sheets and the amount of consumed printing material and transmits the job log to the first server apparatus 103 via the network 102.

It is possible for the service provider to grasp the number of sheets printed during one month, calculate the consumption rate of consumables, and so on based on the information included in the job log. Depending on the contract contents of the flat-rate service, at timing at which the remaining amount of consumables becomes less than or equal to a predetermined value, additional consumables are shipped to the user.

Because of this, in order for the service provider to provide the flat-rate service, it is preferable for the environment to be maintained in which the image forming apparatus 104 is connected to the network 102 at all times and it is possible to transmit job logs periodically to the first server apparatus 103. The reason is that in a case where the image forming apparatus 104 is not connected to the network 102, there is a possibility that the first information processing system 100 dose not function preferably.

<Terminal Apparatus 101>

Figure 2:
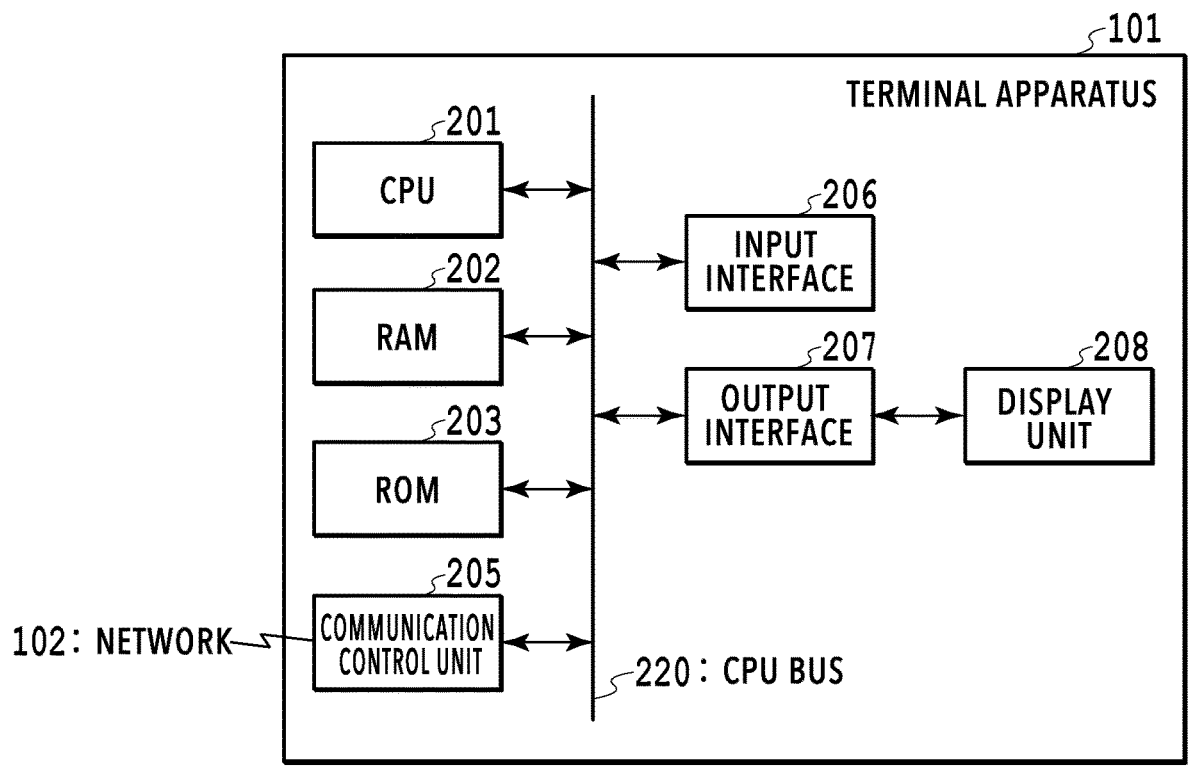
FIG. 2 is a block diagram showing a configuration example of a terminal device in one embodiment.

FIG. 2 is a block diagram showing a configuration example of the terminal apparatus 101 in the present embodiment.

As shown in FIG. 2, the terminal apparatus 101 is configured by including a CPU 201, a RAM 202, a ROM 203, a communication control unit 205, an input interface 206, an output interface 207, a display unit 208, and a CPU bus 220. The CPU 201, the RAM 202, the ROM 203, the communication control unit 205, the input interface 206, the output interface 207, and the display unit 208 are connected to one another via the bus 220 managed by the CPU 201.

The CPU 201 controls the whole terminal apparatus 101 while using the RAM 202 as a work area in accordance with programs stored in the ROM 203. The RAM 202 is a volatile storage unit and temporarily stores programs, information or the like. The ROM 203 is a nonvolatile storage unit and similarly stores programs, information or the like.

The CPU 201 transmits information relating to the flat-rate service from the communication control unit 205 to the first server apparatus 103 via the network 102. It is possible for the communication control unit 205 to control the transmission and reception of information with the first server apparatus 103.

It is possible for the input interface 206 to control an HID (Human Interface Device), such as a keyboard, not shown schematically. It is possible for a user to input information necessary to subscribe to or withdraw from the flat-rate service by using a keyboard or the like. It is possible for the input interface 206 to transmit the input information to the CPU 201.

It is possible for the output interface 207 to control the display unit 208. It is possible for a user to check various types of information via a screen displayed on the display unit 208 by the CPU 201 via the output interface 207. A soft keyboard may be displayed on the display unit 208. In this case, it is possible for a user to input information necessary to subscribe to and withdraw from the flat-rate service by using the soft keyboard.

<First Server Apparatus 103>

Figure 3:
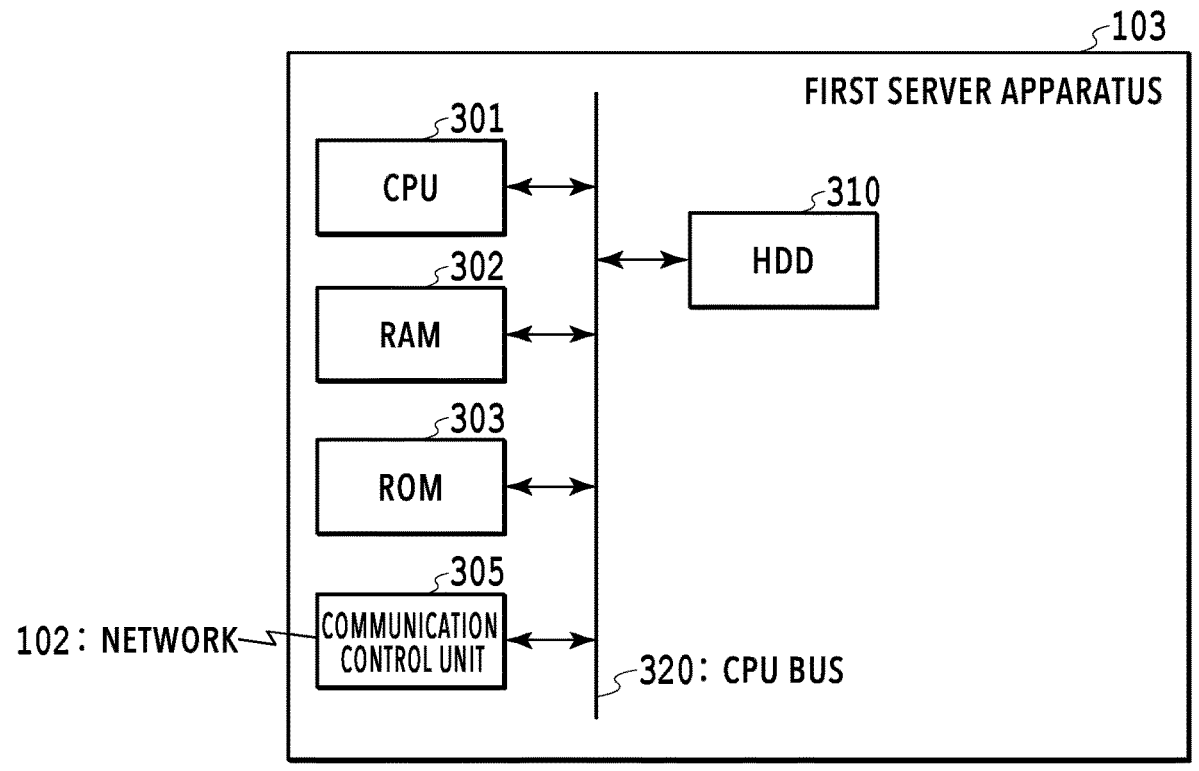
FIG. 3 is a block diagram showing a configuration example of a first server apparatus in one embodiment.

FIG. 3 is a block diagram showing a hardware configuration example of the first server apparatus 103.

As shown in FIG. 3, the first server apparatus 103 is configured by including a CPU 301, a RAM 302, a ROM 303, a communication control unit 305, an HDD (Hard Disk Drive) 310, and a CPU bus 320. The CPU 301, the RAM 302, the ROM 303, the communication control unit 305, and the HDD 310 are connected to one another via the CPU bus 320 managed by the CPU 301.

The CPU 301 controls the whole first server apparatus 103 while using the RAM 302 as a work area in accordance with programs stored in the ROM 303 or software stored in the HDD 310. The RAM 302 is a volatile storage unit and temporarily stores programs, information or the like. The ROM 303 is a nonvolatile storage unit and similarly stores programs, information or the like. The CPU 301 receives information relating to the flat-rate service, which is transmitted via the network 102, from the communication control unit 305

The HDD 310 is a nonvolatile storage unit. It is possible for the HDD 310 to store user information on a user having subscribed to the flat-rate service, the contract contents of the flat-rate service, and identification information for uniquely identifying the image forming apparatus 104 lent to a user in association with one another. For example, in the HDD 310, the user information on a user having subscribed to the flat-rate service, the contract plan of the flat-rate service to which a user has subscribed, and the manufacturer's serial number of the image forming apparatus 104 lent to a user are stored in association with one another.

It is possible for the communication control unit 305 to control the transmission and reception of the contact contents of the flat-rate service to which a user has subscribed, the identification information on the image forming apparatus 104, which is the target of the flat-rate service, the user information and the like with the terminal apparatus 101.

Further, it is possible for the communication control unit 305 to control the transmission and reception of the contract contents of the flat-rate service to which a user has subscribed, the identification information on the image forming apparatus 104, which is the target of the flat-rate service, the user information and the like with the image forming apparatus 104.

<Image Forming Apparatus 104>

Figure 4:
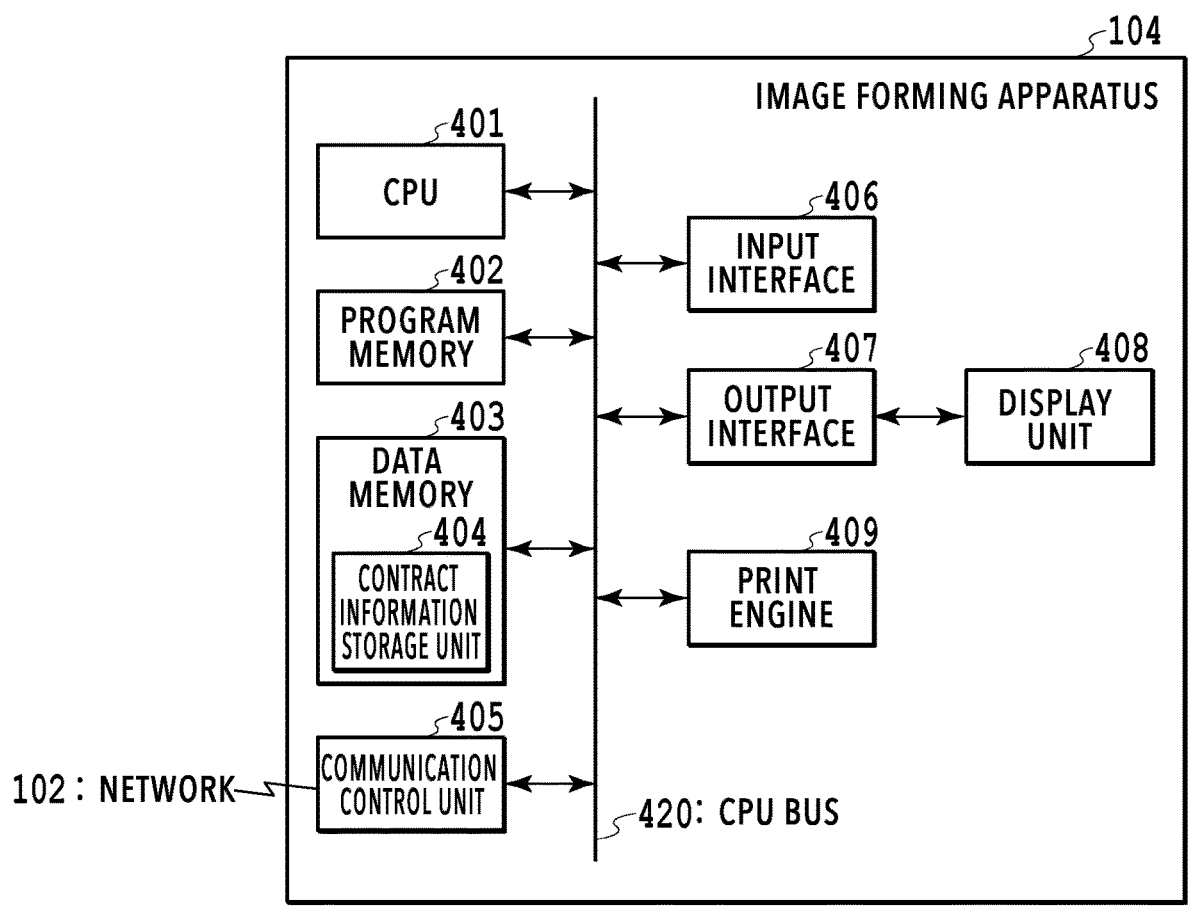
FIG. 4 is a diagram showing a configuration example of an image forming apparatus in one embodiment.

FIG. 4 is a diagram showing a configuration example of the image forming apparatus 104 in the present embodiment.

As shown in FIG. 4, the image forming apparatus 104 is configured by including a CPU 401, a program memory 402, a data memory 403, a communication control unit 405, an input interface 406, an output interface 407, a display unit 408, and a print engine 409. The data memory 403 is configured by including a contract information storage unit 404.

The CPU 401, the program memory 402, the data memory 403, the communication control unit 405, the input interface 406, the output interface 407, the display unit 408, and the print engine 409 are connected to one another via a CPU bus 420. The CPU bus 420 is managed by the CPU 401.

The CPU 401 is a system control unit and capable of controlling the whole image forming apparatus 104. It is possible for the program memory 402 to store control programs performed by the CPU 401, the incorporated operating system program and the like. For example, in the program memory 402, firmware for causing the image forming apparatus 104 to operate is stored.

In the program memory 402, a control program relating to the automatic power-on function for automatically turning on the image forming apparatus 104 is stored. In the program memory 402, a control program relating to the automatic power-off function for automatically turning off the image forming apparatus 104 is stored. For example, in a case where information indicating that a user has withdrawn from the flat-rate service is received, the image forming apparatus 104 is automatically turned off after five minutes elapse from the time in point of the reception of the information. It may also be possible to restrict the operation of the image forming apparatus 104 so that the image forming apparatus 104 cannot be turned on again by the control program in a case where the image forming apparatus 104 is turned off as described above.

In the program memory 402, a control program relating to the schedule-on function for causing the image forming apparatus 104 to operate at a predetermined date designated by a user is stored. For example, in a case where information indicating that a user has withdrawn from the flat-rate service is received, it may also be possible to restrict the operation of the image forming apparatus 104 so that the schedule-on function cannot be activated by the control program.

In the program memory 402, a control program relating to the schedule-off function for causing the image forming apparatus 104 to stop at a predetermined date designated by a user is stored.

In the program memory 402, a control program relating to the information notification setting for notifying information relating to the image forming apparatus 104 is stored. For example, in a case where the information notification setting is set to on by a user, upon receipt of information relating to the image forming apparatus 104, the information is displayed on the display unit 408. In a case where the information notification setting is set to off by a user, even though information relating to the image forming apparatus 104 is received, the information is not displayed on the display unit 408. For example, in a case where information indicating that a user has withdrawn from the flat-rate service is received, it may also be possible to restrict the operation of the display unit 408 so that the information notification setting is set to off without fail by the control program.

In the program memory 402, a control program relating to the notification setting about the updating of the firmware is stored. In the present embodiment, the configuration is such that in a case where the firmware of the most recent version is stored in an HDD 510 (see FIG. 5), on a condition that information on the updating of the firmware is received, the information is displayed on the display unit 408 by the control program. That is, in the present embodiment, the notification setting is set to on without fail. However, in a case where a user purchases the image forming apparatus 104, which is the target of the flat-rate service, it may also be possible to permit the notification setting to be set to off by the control program. In a case where the notification setting is set to off by a user, even though information relating to the updating of the firmware is received, the information is not displayed on the display unit 408.

It is possible for the data memory 403 to store program control variables and the like. As one example of the program control variable, there is an initial setting flag indicating whether or not the setting being performed at present for the image forming apparatus 104 is the setting that is performed for the first time. In the present embodiment, at the point in time of the shipment of the image forming apparatus 104, the initial setting flag is in the state indicating on.

As another example of the program control variable, there is an automatic updating flag indicating that the firmware of the image forming apparatus 104 is updated automatically in a case where the image forming apparatus 104 is connected to the second server apparatus 105. In a case where the automatic updating flag is on, automatic updating of the firmware shown by processing in FIG. 7 and FIG. 8, to be described later, is performed.

In the present embodiment, as timing at which there is a possibility that the automatic updating flag is changed, there is a product-arrival sequence. The product-arrival sequence will be described later by using FIG. 6.

In addition to the above, in the data memory 403, various work buffer areas utilized in the processing of the print engine 409 are provided.

It is possible for the contract information storage unit 404 to store information relating to the contract contents of the flat-rate service to which a user has subscribed. For example, information as follows may be stored.

Information indicating that only the image forming apparatus 104 is lent to a user.

Information indicating that the image forming apparatus 104 is lent to a user and consumables are delivered periodically to the user.

Information indicating that only consumables are delivered periodically.

Information indicating that a user has not subscribed to the flat-rate service.

In the contract information storage unit 404, one of these pieces of information is stored.

For example, it is assumed that a user has subscribed to the flat-rate service requesting lending of the image forming apparatus 104 and periodic delivery of consumables. In this case, the image forming apparatus 104 is shipped to the user in the state where information indicating that the image forming apparatus 104 is lent to the user and consumables are delivered to the user periodically is stored in the contract information storage unit 404. The image forming apparatus 104 of the first embodiment is the device premised on that the image forming apparatus main body is lent to the user in its entirety as described above.

In a case where information indicating that a user has withdrawn from the flat-rate service is input, the information stored in the contract information storage unit 404 is updated. For example, the information indicating that consumables are delivered to the user periodically is updated to information indicating that the consumables are not delivered to the user. The information indicating that the image forming apparatus 104 is lent to the user is updated to information indicating that the image forming apparatus 104 is returned to the service provider. The information indicating that the image forming apparatus 104 is lent to the user is updated to information indicating that the image forming apparatus 104 is purchased by the user and the image forming apparatus 104 is continued to be utilized by the user.

The communication control unit 405 controls the transmission and reception of information with the terminal apparatus 101, the first server apparatus 103, and the second server apparatus 105. The transmission and reception of information between the image forming apparatus 104 and the terminal apparatus 101, the first server apparatus 103, and the second server apparatus 105 are performed via the network 102.

The input interface 406 is an interface for receiving an information input, operation instructions or the like from a user. For example, the input interface 406 includes a physical keyboard, a button, a touch panel, or the like.

The output interface 407 is an interface performing control for displaying information, notification indicating the state of the image forming apparatus 104, or the like on the display unit 408. It is possible for the output interface 407 to cause the display unit 408 to display a "home screen" including a "setting" button for setting the function of the image forming apparatus 104. Then, in a case where the "setting" button is pressed down, it is possible to cause the display unit 408 to display a "setting screen" for setting a variety of functions of the image forming apparatus 104.

However, in the image forming apparatus 104 of the present embodiment, which is the target of the flat-rate service, the program is composed so that an "automatic updating setting" button for performing the setting relating to the automatic updating function of the firmware is not displayed even though the "setting screen" is displayed. That is, for the setting screen relating to the updating of the firmware, the program is composed so that the setting screen not including the item for a user to select activation or deactivation of the automatic updating function is displayed.

The program may be composed so that the "automatic updating setting" button for performing the setting relating to the automatic updating function of the firmware is displayed on the "setting screen". That is, for the setting screen relating to the updating of the firmware, the program may be composed so that the setting screen on which it is possible for a user to select activation or deactivation of the automatic updating function is displayed. The image forming apparatus in which the program is composed as described above will be explained in a second embodiment and a third embodiment.

Here, on the display unit 408, information, notification indicating the state of the image forming apparatus 104 or the like is displayed. For example, the display unit 408 includes an LED (Light-Emitting Diode), an LCD (Liquid Crystal Display) or the like.

However, in the image forming apparatus 104 of the present embodiment, there is a case where the "setting screen" is displayed on the display unit 408, but the "automatic updating setting" button is not displayed. Consequently, the "setting screen" is not displayed on the display unit 408.

On the display unit 408, a soft keyboard may be displayed, which includes keys, such as a numerical value input key, a mode setting key, a determination key, a cancel key, and a power key (power button). It may also be possible to receive the input of the operation by a user by displaying a soft keyboard on the display unit 408. That is, the output interface 407 and the input interface 406 may have the same configuration and the output of a screen and the input of the operation by a user may be performed by using the same configuration.

It is possible for the print engine 409 to form an image on a printing medium by using a printing material and output printing results based on information stored in the data memory 403 and the received print job.

<Second Server Apparatus 105>

Figure 5:
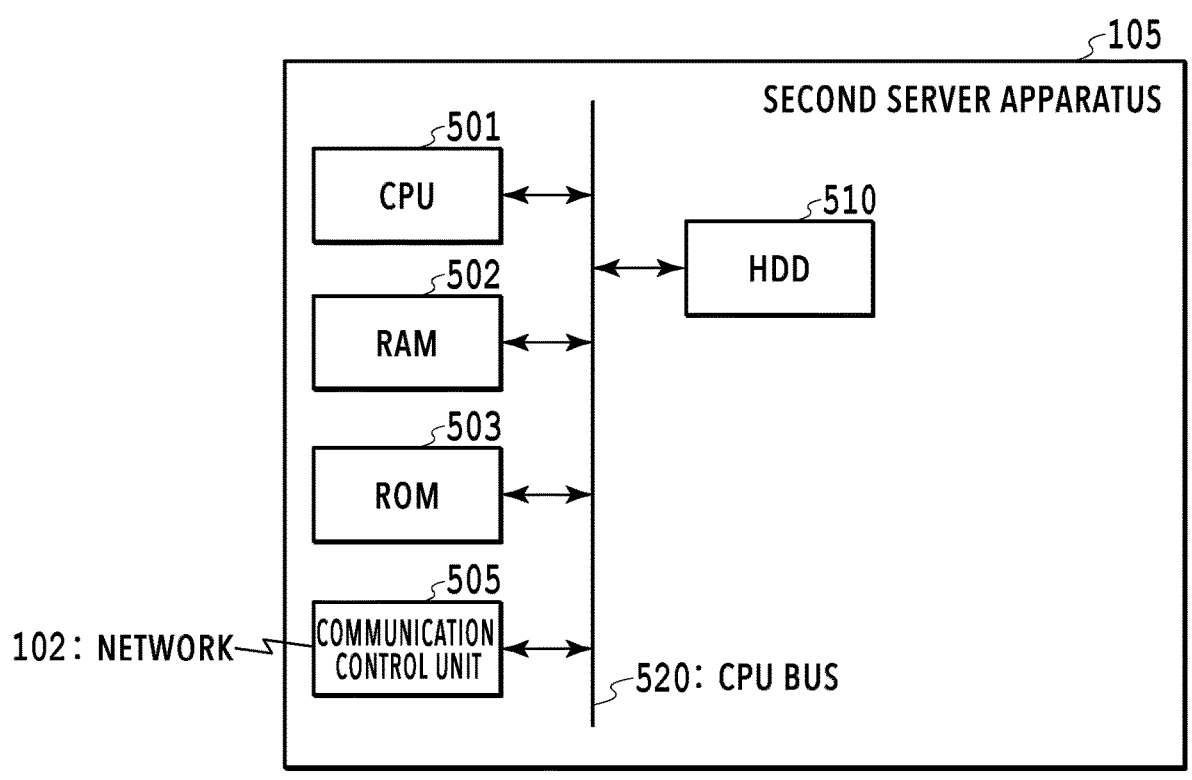
FIG. 5 is a block diagram showing a configuration example of a second server apparatus in one embodiment.

FIG. 5 is a block diagram showing a hardware configuration example of the second server apparatus 105.

As shown in FIG. 5, the second server apparatus 105 is configured by including a CPU 501, a RAM 502, a ROM 503, a communication control unit 505, the HDD 510, and a CPU bus 520. The CPU 501, the RAM 502, the ROM 503, the communication control unit 505, and the HDD 510 are connected to one another via the CPU bus 520 managed by the CPU 501.

The CPU 501 controls the whole second server apparatus 105 while using the RAM 502 as a work area in accordance with programs stored in the ROM 503 or software stored in the HDD 510. The RAM 502 is a volatile storage unit and temporarily stores programs, information or the like. The ROM 503 is a nonvolatile storage unit and similarly stores programs, information or the like.

In a case where the most recent firmware capable of being applied to the image forming apparatus 104 is stored, the CPU 501 transmits the most recent firmware from the communication control unit 305 via the network 102. In the HDD 510, the most recent firmware capable of being applied to the image forming apparatus 104 is stored. The most recent firmware may be stored in another memory, for example, such as the ROM 503.

It is possible for the communication control unit 505 to control the transmission of the most recent firmware for the image forming apparatus 104. For example, provided that the setting is performed so that the automatic updating function of the firmware in the image forming apparatus 104 is activated, in a case where communication is established between the second server apparatus 105 and the image forming apparatus 104, the most recent firmware is transmitted automatically.

<Product-Arrival Sequence of Image Forming Apparatus 104>

The product-arrival sequence in the present embodiment is processing that is performed by the CPU 401 (see FIG. 4)

in a case where the power is turned on for the first time in the state where the image forming apparatus 104 (see FIG. 4) is connected to the power.

In the following, explanation is given by supposing a case where the image forming apparatus 104 shipped by the service provider arrives at a user. Generally, in a case where the image forming apparatus 104 arrives at the user, the user connects the image forming apparatus 104 to the power (the image forming apparatus 104 enters a so-called hardware-on state). In the state where the image forming apparatus 104 is connected to the power, in a case where a "power" button of the image forming apparatus 104 is pressed down and the power is turned on, a variety of pieces of installed software activate (the image forming apparatus 104 enters a so-called software-on state). The product-arrival sequence is performed, for example, with the pressing down of the "power" button displayed on the display unit in the state where the image forming apparatus 104 (see FIG. 4) is connected to the power as a trigger.

Figure 6:
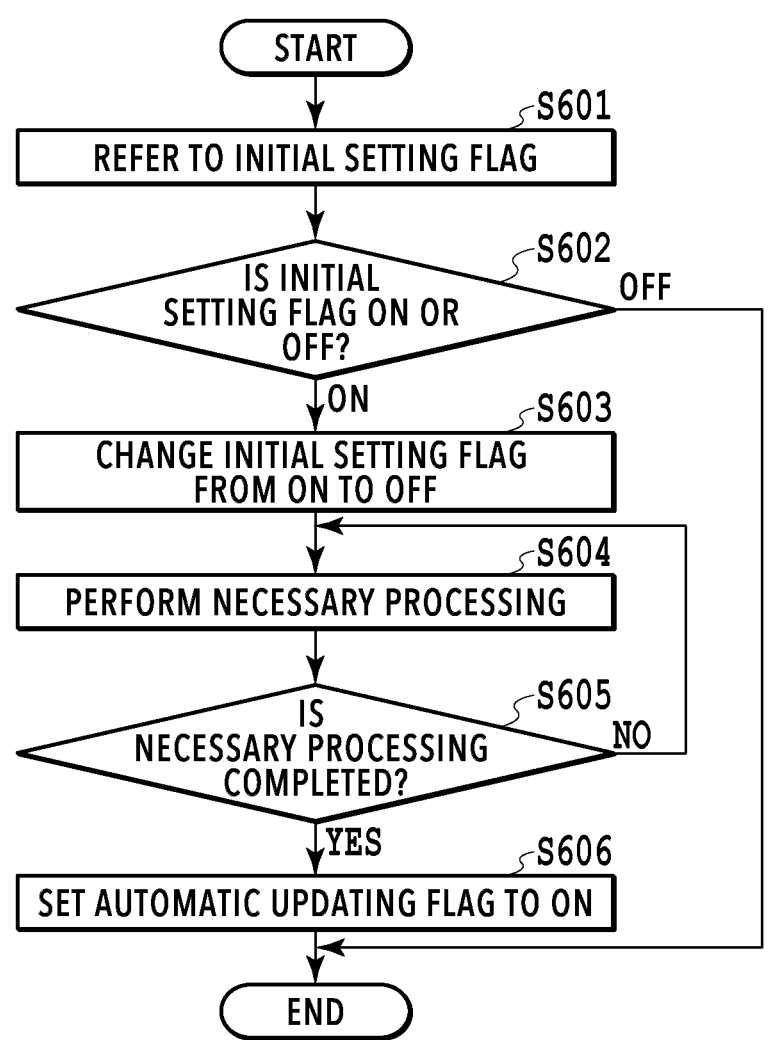
FIG. 6 is a flowchart showing one example of a product-arrival sequence in one embodiment.

FIG. 6 is a flowchart showing one example of the product-arrival sequence that is performed by the image forming apparatus 104 in the present embodiment. A symbol "S" in the explanation of each piece of processing means a step in the present flowchart. This also applies to other flowcharts.

The processing shown in the present flowchart is performed by the CPU 401 (see FIG. 4) loading a program code stored in the program memory 402 (see FIG. 4) onto a work memory, such as a RAM, and executing the program code. As described above, the CPU 401 of the image forming apparatus 104 starts the processing of the present flowchart in a case of detecting that the "power" button is pressed down for the first time.

At S601, the CPU 401 refers to an initial setting flag stored in the data memory 403 (see FIG. 4). After referring to the initial setting flag, the CPU 401 performs the processing at S602.

At S602, the CPU 401 determines whether the initial setting flag indicates on or off based on information indicated by the initial setting flag. The case where the initial setting flag indicates on is a case where the present flowchart is performed for the first time. The CPU 401 performs the processing at S603 and subsequent steps. On the other hand, the case where the initial setting flag indicates off is a case where the present flowchart has already been performed. The CPU 401 terminates the processing.

At S603, the CPU 401 changes the initial setting flag from on to off. Due to this, even in a case where the "power" button is pressed down for the second time or later, the state is brought about where the initial setting flag indicates off. After changing the initial setting flag from on to off, the CPU 401 performs the processing at S604.

At S604, the CPU 401 performs processing necessary for using the image forming apparatus 104. As one example of the processing that is performed at this step, there is initial cleaning of a print head (not shown schematically) comprised by the image forming apparatus 104, or the like. In a case where the processing at this step is completed, the CPU 401 performs the processing at S605.

At S605, the CPU 401 determines whether or not all the processing necessary at the time of product arrival for using the image forming apparatus 104 is completed. In a case where the necessary processing is not completed yet, the CPU 401 repeats the processing at S604 to S605. On the other hand, in a case where the necessary processing is completed, the CPU 401 performs the processing at S606.

At S606, the CPU 401 brings the automatic updating flag stored in the data memory 403 into the state indicating on.

In the present embodiment, it may also be possible to ship the image forming apparatus 104 after setting the automatic updating flag to on at the point in time of shipment. In that case, at the point in time at which the processing at this step is performed, the automatic updating flag normally indicates on. However, in a case where the automatic updating flag indicates on for some reason, the automatic updating flag is changed from the state indicating off to the state indicating on. For example, a configuration may be acceptable in which the automatic updating flag is set to off at the time of shipment and the automatic updating flag is changed to on at the last of the product-arrival sequence of the initial installation. S606 is performed automatically without the operation of a user. After performing the processing at this step, the CPU 401 terminates the processing in the present flowchart. That is, the utilization of the image forming apparatus 104 for the first time by a user premises that the user has subscribed to the flat-rate service. By the product-arrival sequence of the present embodiment being performed, the state is brought about where the automatic updating flag indicates on by default.

The above is the explanation of the product-arrival sequence that is performed by the image forming apparatus 104.

<Automatic Updating of Firmware>

FIG. 7 is a flowchart showing one example of processing that is performed by the image forming apparatus 104 and the second server apparatus 105 in the present embodiment.

The processing shown in the present flowchart is performed by the CPU comprised by each device shown schematically loading a program code stored in the program memory or ROM onto the work memory, such as the RAM, and executing the program code. This also applies to other flowcharts.

The flowchart shown in FIG. 7 is started with the automatic updating flag of firmware being set to on and the product-arrival sequence of the image forming apparatus 104 being completed as a trigger and performed continuously in a case where the image forming apparatus 104 is in the standby state.

At S701, the image forming apparatus 104 obtains the count time from the point in time from which the input interface no longer receives the operation by a user to the point in time at which the input is received again. That is, at this step, the time during which the image forming apparatus 104 is not operated by a user is obtained. In a case where the power of the image forming apparatus 104 is turned off, or in a case where instructions by a user are input to the input interface 406, the above-described count is stopped. Further, in a case where the count is stopped, the count value is reset. In a case of completing the processing at this step, the image forming apparatus 104 performs the processing at S702.

At S702, the image forming apparatus 104 determines whether or not the time exceeds a predetermined value based on the time during which the image forming apparatus 104 is not performed by a user. It is preferable for the predetermined time to be longer than or equal to a time (for example, ten minutes) during which it is possible to perform the updating of firmware. The reason is that it is reasonable for the firmware to be updated during the time during which the image forming apparatus 104 is not used by a user. In a case where the time during which the image forming apparatus 104 is not performed by a user exceeds a predetermined value (YES at S702), the image forming apparatus 104 performs the processing at S703. On the other hand, in a case where the time during which the image forming apparatus 104 is not performed by a user does not exceed the predetermined value (NO at S702), the image forming apparatus 104 repeats the processing at S701 to S702.

At S703, the image forming apparatus 104 transmits specification instructions for specifying the version of the most recent firmware that can be installed to the second server apparatus 105. In the specification instructions, identification information for uniquely specifying the image forming apparatus 104 is included. In a case where the communication control unit 505 of the second server apparatus 105 receives the specification instructions correctly, the second server apparatus 105 performs the processing at S704.

At S704, the second server apparatus 105 refers to the identification information included in the specification instructions among a plurality of pieces of stored firmware. Then, the second server apparatus 105 specifies the most recent firmware corresponding to the image forming apparatus 104 uniquely specified by the identification information. In a case of completing the processing at this step, the second server apparatus 105 performs the processing at S705.

At S705, the second server apparatus 105 transmits information including the version of the most recent firmware and the capacity (size) of the most recent firmware to the image forming apparatus 104. In this information, the type, the model type or the like of the image forming apparatus in which it is possible to install the most recent firmware may be included. In a case of receiving the information including the version of the most recent firmware correctly, the image forming apparatus 104 performs the processing at S706.

At S706, the image forming apparatus 104 compares the version of the most recent firmware and the version of the already-installed firmware. In a case of completing the processing at this step, the image forming apparatus 104 performs the processing at S707.

At S707, the image forming apparatus 104 determines whether or not the version of the most recent firmware is more recent than the version of the installed firmware based on the above-described comparison results. In a case where the version of the most recent firmware is more recent than the version of the installed firmware (YES at S707), the image forming apparatus 104 performs the processing at S708. On the other hand, in a case where the firmware installed in the image forming apparatus 104 is the most recent firmware (NO at S707), the image forming apparatus 104 repeats the processing at S701 to S703 and S706.

At S708, the image forming apparatus 104 requests the second server apparatus 105 to transmit the most recent firmware. In a case of receiving the transmission request correctly, the second server apparatus 105 performs the processing at S709.

At S709, the second server apparatus 105 transmits the most recent firmware to the image forming apparatus 104. In the stage of receiving part of the most recent firmware, the image forming apparatus 104 starts the processing at S710. After performing the processing at S709, the second server apparatus 105 terminates the processing of the present flowchart.

At S710, the image forming apparatus 104 performs the firmware updating processing. After performing the processing at this step, the image forming apparatus 104 terminates the processing of the present flowchart.

The above is the explanation of the processing that is performed by the image forming apparatus 104 and the second server apparatus 105 in a case where the image forming apparatus 104 is in the standby state. In the following, the processing that is performed at S710 is explained in detail by using FIG. 8.

<Details of Firmware Reception Processing (S710)>

Figure 8:
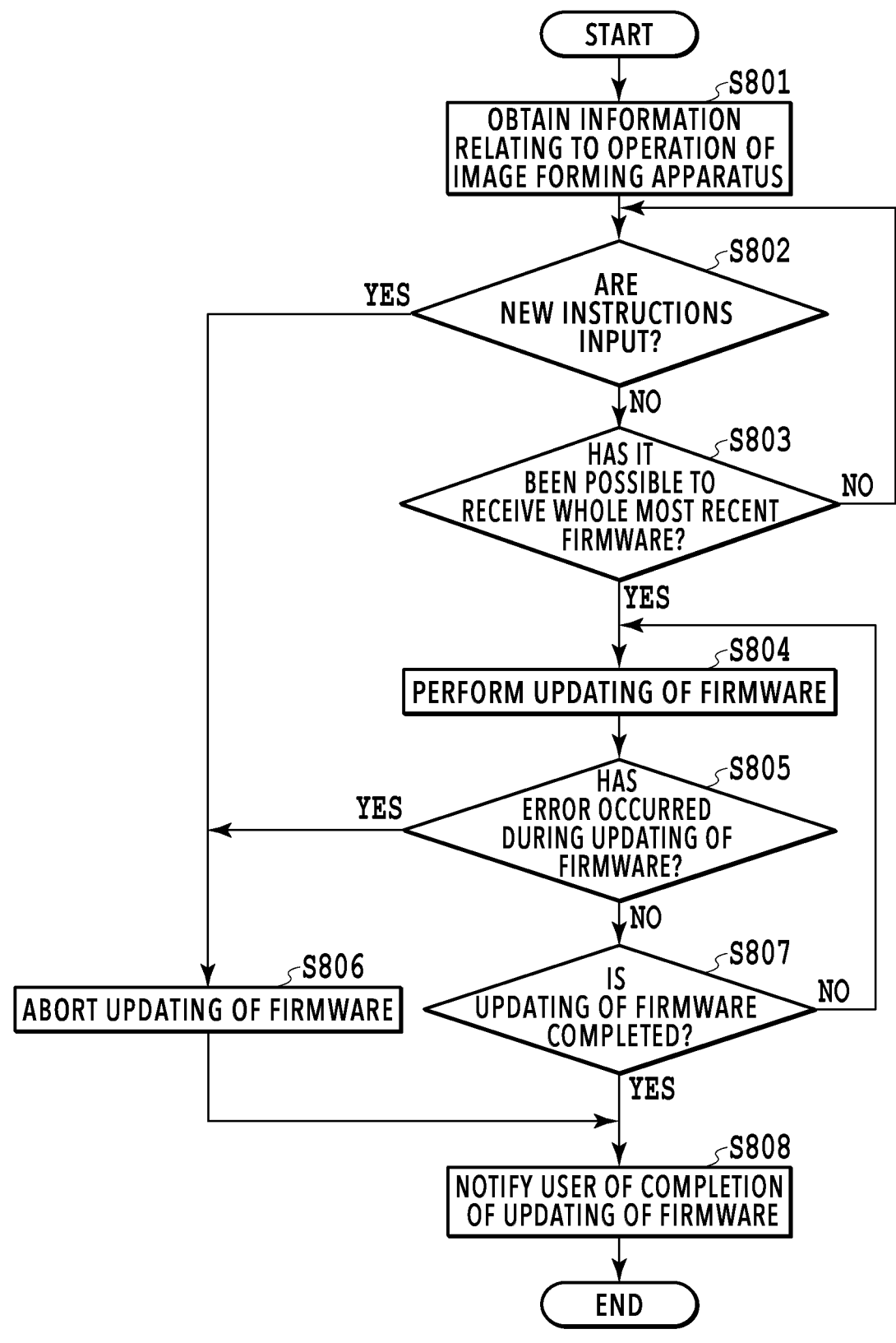
FIG. 8 is a flowchart showing one example of firmware updating processing in one embodiment.

FIG. 8 is a flowchart showing one example of processing that is performed in a case where the firmware installed in the image forming apparatus 104 (see FIG. 4) of the present embodiment is updated.

At S801, the CPU 401 (see FIG. 4) comprised by the image forming apparatus 104 obtains information relating to the operation of the image forming apparatus 104.

At S802, the CPU 401 determines whether or not new instructions are input to the image forming apparatus 104 by a user based on the information relating to the operation of the image forming apparatus 104. In a case where new instructions are input (YES at S802), the CPU 401 moves to S806 and terminates the present processing. Then, the CPU 401 performs processing corresponding to the newly input instructions with priority. For example, even in a case where the time during which the image forming apparatus 104 is not operated exceeds ten minutes and after the reception of the most recent firmware is started, on a condition that instructions to produce a printout or the like are input, YES is determined at S802 and the present processing is aborted at S806. On the other hand, in a case where new instructions are not input to the image forming apparatus 104 (NO at S802), the CPU 401 performs the processing at S803.

At S803, the CPU 401 determines whether or not it has been possible to receive the whole most recent firmware by comparing the capacity of the most recent firmware obtained at S705 and the current capacity of the memory used for the storage of the capacity. In a case where it has been possible to receive the whole most recent firmware (YES at S803), the CPU 401 performs the processing at S804. On the other hand, in a case where the whole most recent firmware has not been received yet (NO at S803), the CPU 401 repeats the processing at S802 to S803.

At S804, the CPU 401 starts processing for updating the firmware installed in the image forming apparatus 104 to the most recent firmware transmitted from the second server apparatus 105. Then, in the state where the updating processing is still in progress, the CPU 401 moves to S805.

At S805, the CPU 401 determines whether or not an error has occurred during the updating of the firmware. As one example of an error, there is disconnection between the image forming apparatus 104 and the network, failure in processing to write information necessary for updating the firmware to the data memory, or the like. In a case where an error has occurred during the updating of the firmware (YES at S805), the CPU 401 moves to S806 and aborts the updating of the firmware, and then terminates the present processing. On the other hand, in a case where no error is detected (NO at S805), the CPU 401 performs the processing at S807.

At S806 the CPU 401 aborts the updating of the firmware. After performing the processing at this step, the CPU 401 terminates the processing of the present flowchart.

At S807, the CPU 401 determines whether or not the updating of the firmware is completed. In a case where the updating of the firmware is completed (YES at S807), the CPU 401 performs the processing at S808. On the other hand, in a case where the updating of the firmware is not completed (NO at S807), the CPU 401 repeats the processing at S804 to S805.

At S808, the CPU 401 notifies a user that the updating of the firmware is completed. At this step, a user may be notified of information indicating the version of the updated firmware and the like. Specifically, a screen showing the completion of the updating of the firmware or the version of the updated firmware, or showing both is displayed on the display unit 408 (see FIG. 4). After performing the processing at this step, the CPU 401 terminates the processing of the present flowchart.

The above is the explanation of the details of the firmware reception processing that is performed by the image forming apparatus (information processing apparatus) in the present embodiment.

As explained above, according to the information processing apparatus of the present embodiment, after information indicating that a user has subscribed to the flat-rate service is obtained, the state is brought about where the automatic updating flag of the information processing apparatus indicates on by default. Then, in a case where the most recent firmware is stored in the second server apparatus, the most recent firmware is automatically installed in the information processing apparatus. Further, this installation is performed at appropriate timing while the information processing apparatus is in the standby state.

However, in a case where instructions by a user, such as instructions to print an image, are input during the installation, the installation of the most recent firmware is aborted and the operation in accordance with the input instructions is performed with priority.

Conclusion

As explained above, the timing at which there is a possibility that the automatic updating flag of the predetermined program installed in the information processing apparatus in the present embodiment is changed is only in the product-arrival sequence. That is, in a case of the image forming apparatus of the present embodiment, which is the target of the flat-rate service, as shown in FIG. 6, after the automatic updating flag is set so as to automatically indicate on in the product-arrival sequence, there is no chance for a user to change the automatic updating flag to off. Specifically, the "automatic updating setting "button is not displayed on the display unit.

Because of this, it is possible for the service provider to provide the user with the flat-rate service for which a certain quality is guaranteed. For example, there is also a case where it is possible to eliminate trouble having occurred in the information processing apparatus by automatically updating the firmware. In addition, there is also a case where it is possible to add a new function to the information processing apparatus by automatically updating the firmware. That is, it is possible for a user to use the information processing apparatus in the state where a certain quality is guaranteed without the need to pay attention to the version of the firmware.

Further, it is possible for the information processing apparatus in the present embodiment to automatically receive the most recent predetermined program from the second server apparatus be being connected to the second server apparatus. Consequently, in the state where the information processing apparatus is connected to the second server apparatus, it is possible for the information processing apparatus to automatically update the predetermined program.

Further, the information processing apparatus in the present embodiment receives the most recent predetermined program and performs the firmware updating processing in a case where the information processing apparatus does not operate for a predetermined time. According to the configuration such as this, it is also possible to suppress the information processing apparatus from becoming unavailable because the firmware updating processing is started while a user is using the information processing apparatus.

In addition, even in a case where there is a time during which the information processing apparatus does not operate, on a condition that the time is too short to update the firmware, the firmware updating processing is not started.

Consequently, according to the information processing apparatus in the present embodiment, it is possible to automatically update the predetermined program more securely than before.

For example, by taking the image forming apparatus thus configured as the target of the flat-rate service, it is possible for the service provider to provide the user with a printing environment for which a certain quality is guaranteed.

Second Embodiment

An object of the resent embodiment is to provide an information processing system including an image forming apparatus capable of freely switching between the setting to activate the automatic updating function of a predetermined program and the setting to deactivate it. In the following explanation, explanation of the configuration the same as or corresponding to that of the first embodiment is omitted as appropriate and different points are explained mainly.

<Configuration of Whole System>

Figure 9:
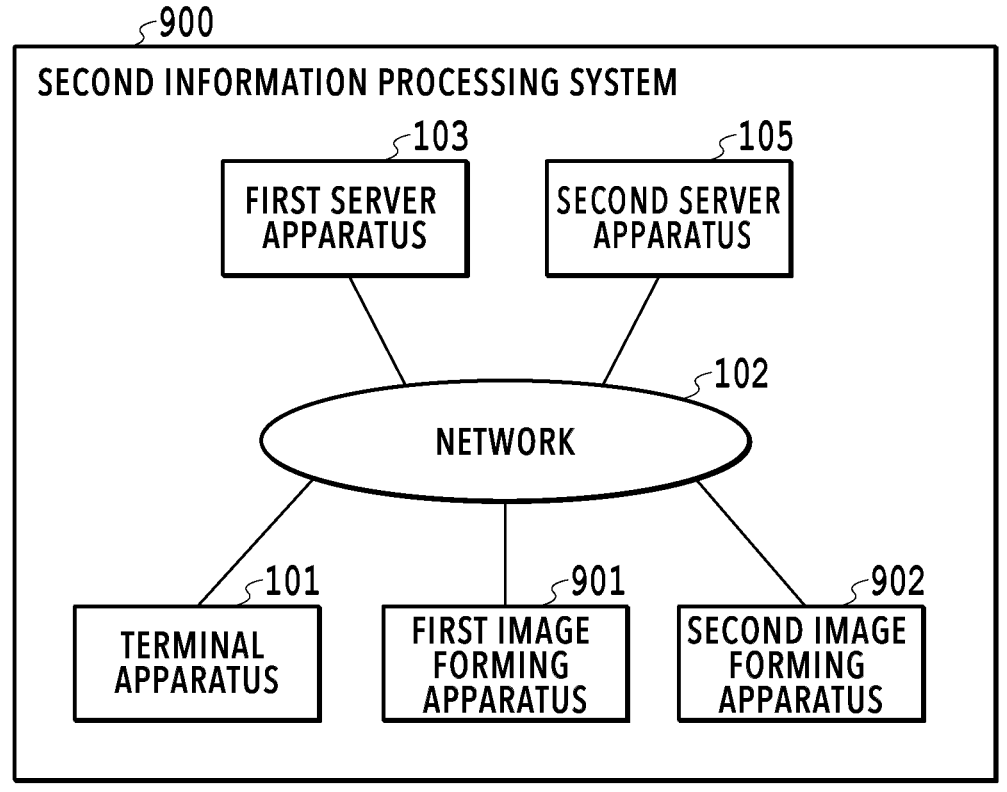
FIG. 9 is a schematic diagram showing a configuration of a whole system of an information processing system in one embodiment.

FIG. 9 is a schematic diagram showing the configuration of the whole system of a second information processing system 900 in the present embodiment.

As shown in FIG. 9, the second information processing system 900 is configured by including a first image forming apparatus 901 and a second image forming apparatus 902 as information processing apparatuses. The configuration of the first image forming apparatus 901 is the same as the configuration of the image forming apparatus 104. That is, the first image forming apparatus 901 is the image forming apparatus that is shipped on the premise that the image forming apparatus main body is lent to a user in its entirety, but after the shipment, it is also possible for a user to utilize the image forming apparatus continuously like the general product on the market by purchasing the image forming apparatus. However, the present embodiment differs from the first embodiment in that an automatic updating setting permit flag, to be described later, is stored and managed. In the first image forming apparatus 901, a predetermined program is also installed. In the present embodiment also, explanation is given by supposing a case where the predetermined program is firmware.

The second image forming apparatus 902 is generally the image forming apparatus that is shipped with a schedule to be sold in the market. Because of this, it is possible to set the second image forming apparatus 902 so as to deactivate the automatic updating function of the installed firmware. Specifically, the second image forming apparatus 902 also performs the product-arrival sequence (see FIG. 6), but in place of the processing (process at S606) to set the automatic updating flag to on, the second image forming apparatus 902 performs processing to display a screen on which to select whether or not to activate the automatic updating function of the firmware. Then, upon receipt of instructions to activate the automatic updating function from a user, the second image forming apparatus 902 sets the automatic updating flag to on and leaves the automatic updating flag off upon receipt of instructions not to activate, that is, instructions to deactivate the automatic updating function.

However, there is generally a case where the second image forming apparatus 902 is taken as the target of the flat-rate service after being sold in the market. For example, there is a case where after the service provider collects the second image forming apparatus 902, which was the target for sale on the market, the second image forming apparatus 902 is taken as target of the flat-rate service. In this case, the program code of the product-arrival sequence is changed from the program code displaying the selection screen to the program code having the process at S606.

On the contrary, there is also a case where after the second image forming apparatus 902, which was the target of the flat-rate service, is returned from a user to the service provide, the service provider generally sells the second image forming apparatus 902 in the market. In this case, the program code of the product-arrival sequence is changed from the program code having the process at S606 to the program code displaying the selection screen.

In order to change the product-arrival sequence as described above, the second image forming apparatus 902 stores and manages the automatic updating setting permit flag <Second Image Forming Apparatus 902>

Figure 10:
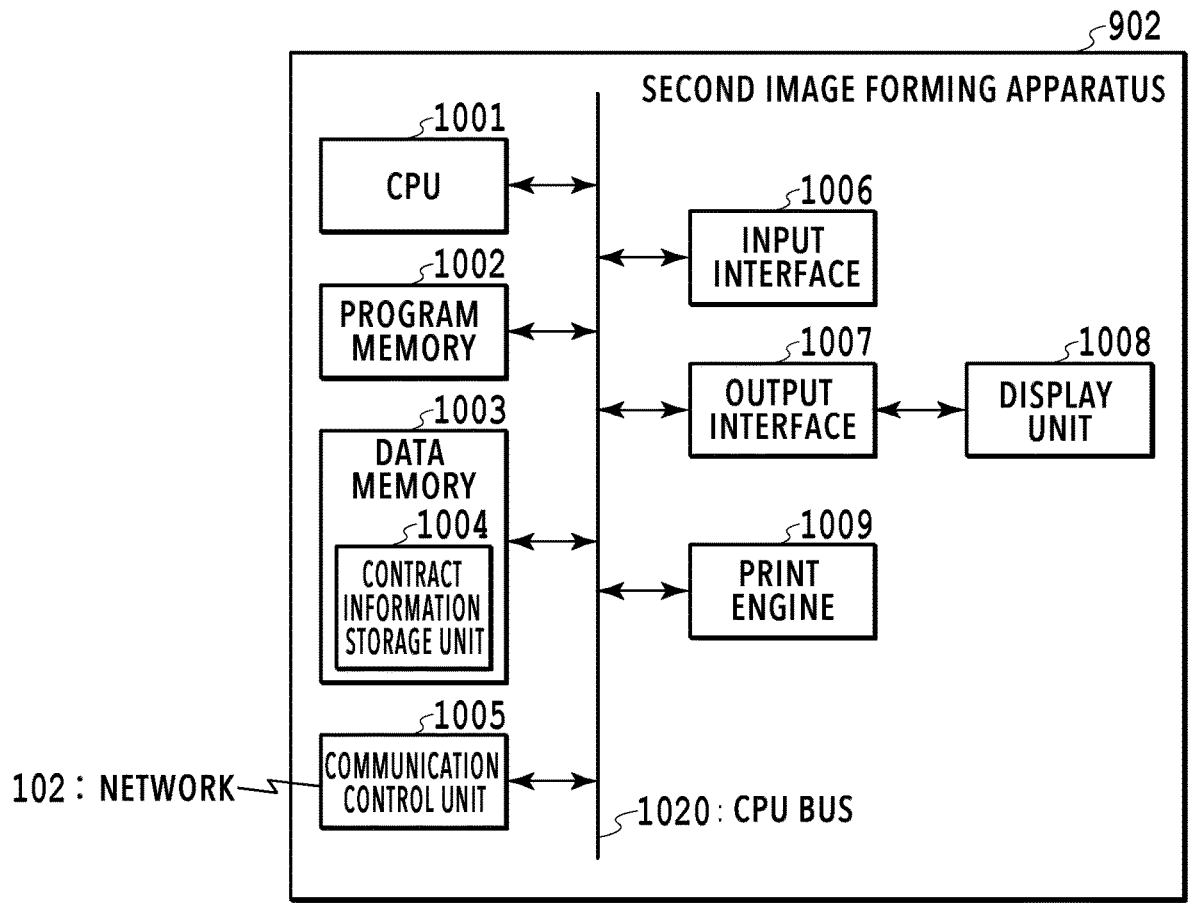
FIG. 10 is a block diagram showing a configuration example of an image forming apparatus in one embodiment.

FIG. 10 is a block diagram showing a configuration example of the second image forming apparatus 902 in the present embodiment.

As shown in FIG. 10, the second image forming apparatus 902 is configured by including a CPU 1001, a program memory 1002, a data memory 1003, and a communication control unit 1005. The data memory 1003 is configured by including a contract information storage unit 1004. Further, in the configuration of the second image forming apparatus 902, an input interface 1006, an output interface 1007, a display unit 1008, and a print engine 1009 are included. Each of the above-described configurations is connected to one another via a CPU bus 1020 managed by the CPU 1001.

As described above, the hardware configuration comprised by the second image forming apparatus 902 is similar to that of the first image forming apparatus 901. However, the software control that is performed by the second image forming apparatus 902 is different from the software control that is performed by the first image forming apparatus 901. Specifically, the contents of the programs stored in the program memory 1002 are different from the contents of the program stored in the program memory 402 of the first image forming apparatus 901.

The CPU 1001 is a system control unit and controls the whole second image forming apparatus 902. In the program memory 1002, control programs that are performed by the CPU 1001, incorporated operating system programs, firmware and the like are stored.

It is possible for the data memory 1003 to store program control variables and the like. As one example of the program control variable, there is an initial setting flag indicating whether or not the setting that is performed currently for the second image forming apparatus 902 is the setting that is performed for the first time. In the present embodiment, at the point in time of the shipment of the second image forming apparatus 902, the initial setting flag is in the state indicating on.

As another example of the program control variable, there is an automatic updating flag indicating that the firmware of the second image forming apparatus 902 is updated automatically in a case where the second image forming apparatus 902 is connected to the second server apparatus 105. In a case where the automatic updating flag indicates on, the second image forming apparatus 902 automatically downloads the most recent firmware from the second server apparatus 105. Further, as another example of the program control variable, there is an automatic updating setting permit flag. In a case where the automatic updating setting permit flag of the second image forming apparatus 902 indicates on, the setting to deactivate the automatic updating function of the firmware is not permitted. Specifically, the state is brought about where the automatic updating flag automatically indicates on by the processing shown at S606 in the product-arrival sequence. Then, on the setting screen relating to the firmware updating, the setting is performed so that the item for selecting activation or deactivation of the automatic updating function is not displayed.

On the other hand, in a case where the automatic updating setting permit flag indicates off, it is possible for the second image forming apparatus 902 to cause a user to select whether or not to automatically download the most recent firmware from the second server apparatus 105. That is, in a case where the automatic updating setting permit flag of the second image forming apparatus 902 indicates off, it is permitted to set so as to deactivate the automatic updating function of the firmware. For example, as described previously, in the product-arrival sequence, the selection screen for selecting whether or not to activate the automatic updating function is displayed, the "selection screen" on which it is possible to select activation or deactivation of the automatic updating function of the most recent firmware is displayed, and so on. The processing to display the "selection screen" will be described later. In the present embodiment, at the point in time of the shipment of the second image forming apparatus 902, the automatic updating flag is in the state indicating on. In a case where the firmware of the second image forming apparatus 902 is not the most recent version, it is possible for the CPU 1001 to update the firmware stored in the data memory 1003 to the most recent firmware. In addition, in the data memory 1003, various work buffer areas that are utilized in the processing of the print engine 1009 are provided.

It is possible for the contract information storage unit 1004 to store information relating to the contract contents of the flat-rate service to which a user has subscribed. For example, information as follows is stored.

Information indicating that only the second image forming apparatus 902 is lent to a user.

Information indicating that the second image forming apparatus 902 is lent to a user and consumables are delivered periodically to the user.

Information indicating that only consumables are delivered periodically.

Information indicating that a user has not subscribed to the flat-rate service.

In the contract information storage unit 1004, one of pieces of the information described above is stored.

The communication control unit 1005 controls the transmission and reception of information with the terminal apparatus 101, the first server apparatus 103, and the second server apparatus 105. The transmission and reception of information between the second image forming apparatus 902 and the terminal apparatus 101, the first server apparatus 103, and the second server apparatus 105 are performed via the network 102.

In a case where the most recent firmware is received via the communication control unit 1005, it is made possible to update the firmware stored in the program memory 1002 to the most recent firmware. In the present embodiment, the updating of the firmware may be performed automatically in a case where the most recent firmware is received, or may be performed after instructions to update the firmware by a user are received.

The input interface 1006 is an interface for receiving instructions to input information and instructions to perform the operation from a user. The output interface 1007 is an interface for performing control for the display unit 1008 to display information, give a notification of the state in the second image forming apparatus 902, and so on. It is possible for the output interface 1007 to display the "home screen" including the "setting" button for setting the function of the second image forming apparatus 902 on the display unit 1008. Then, in a case where the "setting" button is pressed down, it is possible to display the "setting screen" for setting a variety of functions of the second image forming apparatus 902 on the display unit 1008. In the present embodiment, in a case where the above-described automatic updating setting permit flag is in the state of being set to on, the "setting screen" including the "automatic updating setting" button is displayed.

On the display unit 1008, information, a notification indicating the state of the second image forming apparatus 902, or the like is displayed. Because of this, it is possible for a user to freely switch between activation and deactivation of the automatic updating function of the firmware of the second image forming apparatus 902 by pressing down the "automatic updating setting" button displayed on the display unit 108. The print engine 1009 forms an image on a printing medium by using a printing material based on information stored in the data memory 1003, the received print job and the like and outputs the print results.

<Flow of Processing in Whole Information Processing System>

Originally, the second image forming apparatus 902 is the target for sale on the market and not the target of the flat-rate service. Because of this, the automatic updating function of the firmware of the second image forming apparatus 902 may be set by a user so that the automatic updating function is deactivated.

However, as described above, there is a case where the second image forming apparatus 902 is taken as the target of the flat-rate service after being shipped as the target for sale on the market. In such a case, it is preferable to change the state so that the firmware installed in the second image forming apparatus 902 is updated automatically without fail.

Further, a case is considered where even for the apparatus for which it is supposed that the image forming apparatus main body is lent in its entirety like the first image forming apparatus 901, the contract is cancelled on the way by a user, or the contract contents are changed. The change of the contract contents is, for example, that the flat-rate service is changed to only the delivery of consumables. In such a case, on the contrary, it is preferable to change the state where the automatic updating of the firmware is performed without fail to the state where the automatic updating function may be deactivated by a user.

Consequently, in the second image forming apparatus 902, the program is composed so that it is possible to freely switch between activation and deactivation of the automatic updating function of the firmware.

<Switching of Automatic Updating Function of Firmware>

Figure 11:
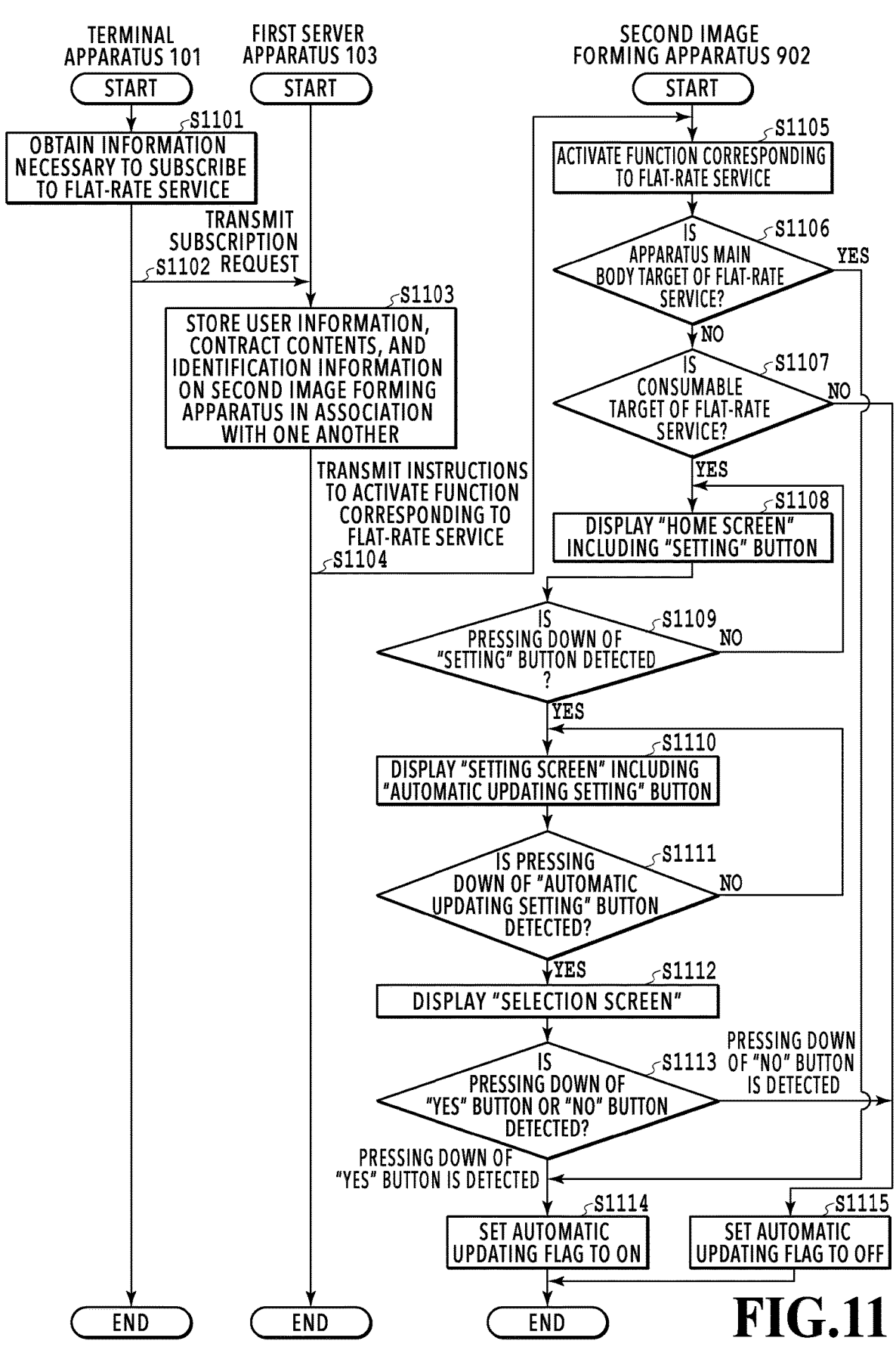
FIG. 11 is a flowchart showing one example of processing to be performed at the time of the contract of the flat-rate service in one embodiment.

FIG. 11 is a flowchart showing one example of processing that is performed at the time of the contract of the flat-rate service in the information processing system of the present embodiment. In FIG. 11, explanation is given by supposing a case where the service provider switches the settings of the automatic updating function of the firmware after collecting the second image forming apparatus 902 that was for sale on the market and before shipping the second image forming apparatus 902 to a user as the target of the flat-rate service.

Further, as the premise that the present flowchart is performed, in the first server apparatus 103, identification information for uniquely specifying the second image forming apparatus 902 is stored in advance. For example, after collecting the second image forming apparatus 902, the service provider inputs identification information on the second image forming apparatus 902 without delay and causes the first server apparatus 103 to store the identification information.

At S1101, the terminal apparatus 101 obtains information on a user who desires to subscribe to the flat-rate service and information relating to the contract contents and the like of the flat-rate service to which the user desires to subscribe. That is, information necessary for the user to subscribe to the flat-rate service is obtained. In a case of completing the processing at this step, the terminal apparatus 101 performs the processing at S1102.

At S1102, the terminal apparatus 101 transmits a subscription request including the above-described user information, the above-described contract contents and the like to the first server apparatus 103. In a case of receiving the subscription request correctly, the first server apparatus 103 performs the processing at S1103. In the following, explanation is given by supposing a case where the service provider admits the subscription to the flat-rate service by the user.

At S1103, the first server apparatus 103 stores the above-described user information, the contract contents of the above-described flat-rate service to which the user has subscribed, and the identification information on the second image forming apparatus 902 taken to be the target of the flat-rate service in association with one another. In a case of completing the processing at this step, the first server apparatus 103 performs the processing at S1104.

At S1104, the first server apparatus 103 transmits instructions for activating the function corresponding to the flat-rate service to the second image forming apparatus 902. In the instructions, the identification information on the second image forming apparatus 902 and the contract contents of the above-described flat-rate service to which the user has subscribed are included. In a case of receiving the instructions correctly, the second image forming apparatus 902 performs the processing at S1105.

At S1105, the second image forming apparatus 902 activates the function corresponding to the flat-rate service. For example, the flag indicating that the function corresponds to the flat-rate service is changed from the state indicating off to the state indicating on. In a case of completing the processing at this step, the second image forming apparatus 902 performs the processing at S1106.

At S1106, the second image forming apparatus 902 determines whether or not the second image forming apparatus 902 itself is the target of the flat-rate service by referring to the identification information on itself (that is, the apparatus main body) and the contract contents of the above-described flat-rate service to which the user has subscribed. In a case where the second image forming apparatus 902 is the target of the flat-rate service (YES at S1106), the second image forming apparatus 902 performs the processing at S1114 without displaying the selection screen at S1112. On the other hand, in a case where the second image forming apparatus 902 is not the target of the flat-rate service (NO at S1106), the second image forming apparatus 902 performs the processing at S1107. In this example, the determination results at this step are YES.

At S1107, the second image forming apparatus 902 determines whether or not the consumable that can be used for the second image forming apparatus 902 is the target of the flat-rate service by referring to the above-described contract contents. In a case where the above-described consumable is the target of the flat-rate service (YES at S1107), the second image forming apparatus 902 performs the processing at S1108. On the other hand, in a case where the above-described consumable is not the target of the flat-rate service (NO at S1107), the second image forming apparatus 902 performs the processing at S1115.

At S1108, the second image forming apparatus 902 displays the "home screen" including the "setting" button on the display unit 1008. In a case of completing the processing at this step, the second image forming apparatus 902 performs the processing at S1109.

At S1109, the second image forming apparatus 902 allocates the processing that is performed subsequently depending on whether or not the pressing down of the "setting" button is detected. In a case where the pressing down of the "setting" button is detected (YES at S1109), the second image forming apparatus 902 performs the processing at S1110. On the other hand, in a case where the pressing down of the "setting" button is not detected (NO at S1109), the second image forming apparatus 902 repeats the processing at S1108 to S1109.

At S1110, the second image forming apparatus 902 displays the "setting screen" including the "automatic updating setting" button on the display unit 1008. In a case of completing the processing at this step, the second image forming apparatus 902 performs the processing at S1111.

At S1111, the second image forming apparatus 902 allocates the processing that is performed subsequently depending on whether or not the pressing down of the "automatic updating setting" button is detected. In a case where the pressing down of the "automatic updating setting" button is detected (YES at S1111), the second image forming apparatus 902 performs the processing at S1112. On the other hand, in a case where the pressing down of the "automatic updating setting" button is not detected (NO at S1111), the second image forming apparatus 902 repeats the processing at S1110 to S1111.

At S1112, the second image forming apparatus 902 displays a screen (in the following, referred to appropriately as "selection screen") for causing a user to select whether or not to automatically update the firmware in a case where the most recent firmware exists on the display unit 1008.

Figure 12:
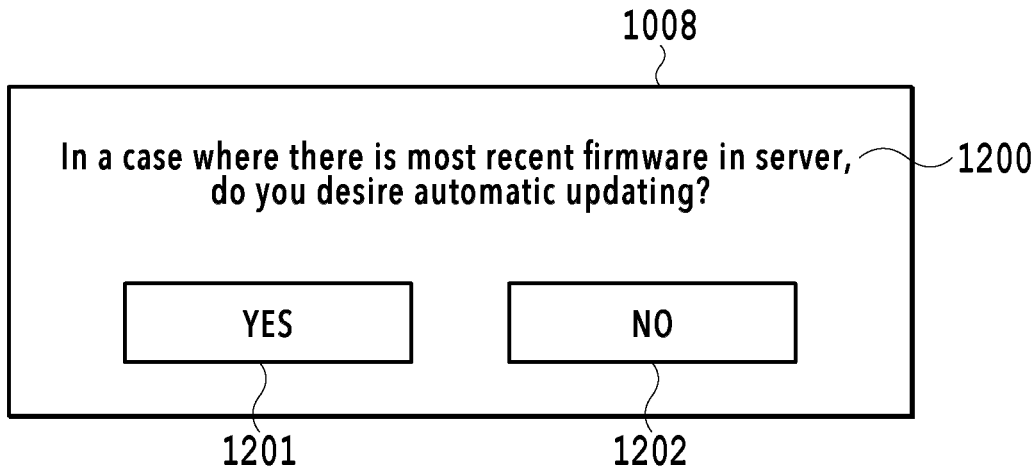
FIG. 12 is a diagram showing one example of a selection screen in one embodiment.

FIG. 12 is a diagram showing one example of the "selection screen" in the present embodiment.

As shown in FIG. 12, a "selection screen" 1200 includes a question sentence for asking a question of whether or not to automatically update the firmware in a case where the most recent firmware exists, a "YES" button 1201, and a "NO" button 1202.

In a case where the pressing down of the "YES" button 1201 is detected, the setting is performed so that it is made possible for the second image forming apparatus 902 to automatically download the most recent firmware in a case where the second image forming apparatus 902 is connected to the second server apparatus 105. On the other hand, in a case where the pressing down of the "NO" button 1202 is detected, the setting is performed so that it is made possible to download the most recent firmware in accordance with instructions for downloading the most recent firmware.

With reference to FIG. 11 again, S1112 is explained. In a case of completing the processing at this step, the second image forming apparatus 902 performs the processing at S1113.

At S1113, the second image forming apparatus 902 allocates the processing that is performed subsequently depending on whether the pressing down of the "YES" button 1201 (see FIG. 12) is detected or the pressing down of the "NO" button 1202 (see FIG. 12) is detected. In a case where the pressing down of the "YES" button 1201 is detected (YES at S1113), the second image forming apparatus 902 performs the processing at S1114. On the other hand, in a case where the pressing down of the "NO" button 1202 is detected (NO at S1113), the second image forming apparatus 902 performs the processing at S1115.

At S1114, the second image forming apparatus 902 brings the automatic updating flag into the state indicating on. After performing the processing at this step, the second image forming apparatus 902 terminates the processing of the present flowchart.

At S1115, the second image forming apparatus 902 brings the automatic updating flag into the state indicating off. In a case where the automatic updating flag indicates off here, it may be possible not to perform the processing. After performing the processing at this step, the second image forming apparatus 902 terminates the processing of the present flowchart.

As explained above, according to the configuration such as this, in a case where the second image forming apparatus 902 is the target of the flat-rate service, the automatic updating flag is set to the state indicating on without the display of the selection image at S1112. That is, a user is no longer permitted to perform the setting so that the automatic updating function of the firmware is deactivated.

On the other hand, in a case where the second image forming apparatus 902 is not the target of the flat-rate service, it is made possible to display the "selection screen". Then, via the "selection screen", it is possible to arbitrarily select whether to deactivate or activate the automatic updating function of the firmware. For example, by the service provider pressing down the "NO" button on the "selection screen", it is permitted to deactivate the automatic updating function of the firmware. Of course, the "NO" button may be pressed down by a user who has purchased the second image forming apparatus 902 and desires the flat-rate service of consumables.

The above is the explanation of the processing that is performed in a case where the settings of the automatic updating function of the firmware are switched.

Conclusion

As explained above, according to the second image forming apparatus 902, it is possible to select activation or deactivation of the automatic updating function of the firmware via the "selection screen". For example, via the "selection screen", it is possible to switch the state where the setting is performed so that the automatic updating function of the firmware is activated to the state where the setting is performed so that the automatic updating function is deactivated. On the contrary, it is possible to switch the state where the setting is performed so that the automatic updating function of the firmware is deactivated to the state where the setting is performed so that the automatic updating function is activated. Due to this, for example, it is made possible for the service provider to collect the second image forming apparatus 902 that was for sale on the market and lend the collected second image forming apparatus 902 to a user as the target of the flat-rate service. On the contrary, it is also made possible for the service provider to collect the second image forming apparatus 902 that is lent as the target of the flat-rate service and put the collected second image forming apparatus 902 on sale on the market after performing the setting so that the automatic updating flag indicates off.

As explained above, according to the second image forming apparatus 902, at the timing at which the flat-rate service taking the second image forming apparatus 902 as the target is contracted, the automatic updating flag is set to on (S1114). After that, each time the "power" button is pressed down, the product-arrival sequence explained in FIG. 6 is performed and the state is brought about where the automatic updating flag indicates on by default. Consequently, after having made the contract of the flat-rate service, it is possible for a user to use the second image forming apparatus 902 with the most recent firmware without the need to pay attention to the version of the firmware unless the user intentionally changes the automatic updating setting.

On the other hand, in a case where the second image forming apparatus 902 is not included in the contract contents, it is possible for a user to arbitrarily switch the settings of the automatic updating flag via the "setting screen". Further, it no longer happens that the automatic updating flag is set automatically each time the "power" button is pressed down. That is, it is possible for a user to switch the settings of the automatic updating flag as appropriate via the "setting screen".

Third Embodiment

An object of the present embodiment is to provide an information processing system including an image forming apparatus capable of turning off the function to automatically update a predetermined program in a case where a user withdraws from the flat-rate service. Explanation of the configuration the same as or corresponding to that of the first and second embodiments is omitted as appropriate and different points are explained mainly.

The image forming apparatus of the present embodiment is configured so that it is possible for a user to freely select activation or deactivation of the automatic updating function of the firmware irrespective of the contents indicated by the automatic updating setting permit flag. For example, the "setting screen" including the "automatic updating setting" button is displayed on the display unit 408 (see FIG. 4). Then, in a case where a user presses down the "automatic updating setting" button, it is made possible for the user to freely select activation or deactivation of the automatic updating function of the firmware. In a case where a user gives instructions to activate the automatic updating function, the automatic updating flag indicates on. In a case where a user gives instructions to deactivate the automatic updating function, the automatic updating flag indicates off. As described above, the image forming apparatus of the present embodiment is configured so as to be capable of receiving user instructions to switch the automatic updating flag to on or off.

Figure 13:
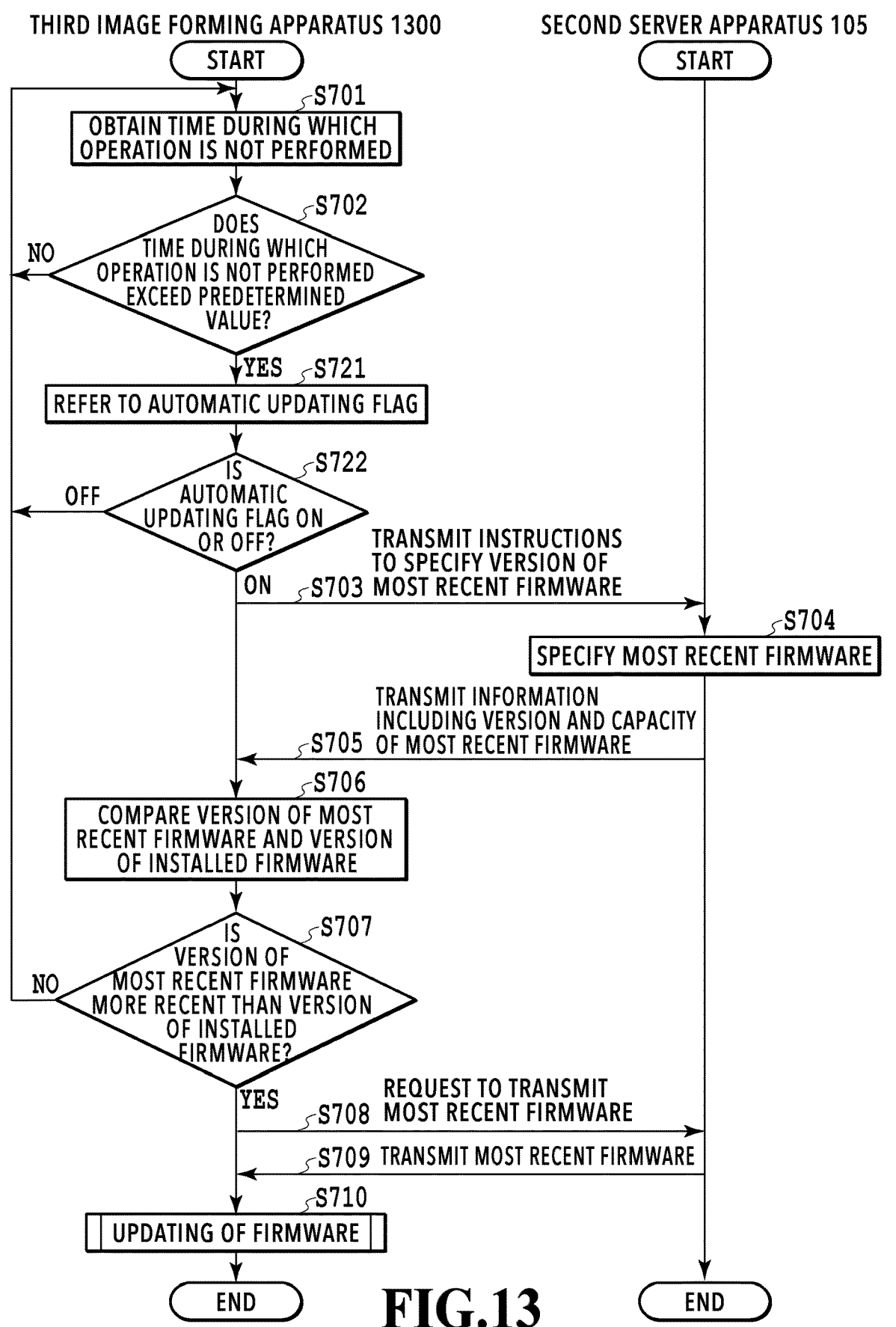
FIG. 13 is a flowchart showing one example of processing to be performed by the image forming apparatus and the second server apparatus.

The flowchart shown in FIG. 13 is started by the automatic updating flag of the firmware being set to on and the completion of the product-arrival sequence of a third image forming apparatus 1300 as a trigger and the flowchart is performed continuously while the third image forming apparatus 1300 is in the standby state. The flowchart of the present embodiment is the processing that is performed in place of the flowchart shown in FIG. 7. The difference between the flowchart of the present embodiment and the flowchart of the first embodiment is the presence/absence of S721 and S722. After the product-arrival sequence in the third image forming apparatus 1300 is completed, the automatic updating flag of the third image forming apparatus 1300 indicates on. However, it is also possible for a user to bring the automatic updating flag into the state indicating off by pressing down the "automatic updating setting" button on the "setting screen" on the display unit 408 (see FIG. 4) and selecting deactivation of the automatic updating function.

In the present embodiment, S721 and S722 are explained mainly, which are the differences from the first embodiment. The other pieces of processing are the same as the processing shown in FIG. 7.

At S702, the third image forming apparatus 1300 determines, based on the time during which the third image forming apparatus 1300 is not performed by a user, whether or not the time exceeds a predetermined value. In a case where the time during which the third image forming apparatus 1300 is not performed by a user exceeds the predetermined value (YES at S702), the third image forming apparatus 1300 performs the processing at S721. On the other hand, in a case where the time during which the third image forming apparatus 1300 is not performed by a user does not exceed the predetermined value (NO at S702), the third image forming apparatus 1300 repeats the processing at S701 to S702.

At S721, the third image forming apparatus 1300 refers to the automatic updating flag stored in the data memory (not shown schematically). After referring to the automatic updating flag, the third image forming apparatus 1300 performs the processing at S722.

At S722, the third image forming apparatus 1300 determines whether the automatic updating flag indicates on or off based on information indicating the automatic updating flag. In a case where the automatic updating flag indicates on, the third image forming apparatus 1300 performs the processing at S703 and subsequent steps. On the other hand, in a case where the automatic updating flag indicates off, the third image forming apparatus 1300 repeats the processing at S701 to S721.

The above is the explanation of the processing that is performed in place of the processing shown in FIG. 7 in the present embodiment.

According to the configuration such as this, for example, in a case where a user purchases the third image forming apparatus 1300, which is the target of the flat-rate service, it is possible for the user to freely switch between activation and deactivation of the automatic updating function of the firmware. That is, according to the configuration of the present embodiment, while the third image forming apparatus 1300 is the target of the flat-rate service, the automatic updating function of the firmware is activated without fail. Then, in a case where a user purchases the third image forming apparatus 1300, which is the target of the flat-rate service, it is also made possible to deactivate the automatic updating function of the firmware.

Consequently, in a case where a user withdraws from the flat-rate service and the third image forming apparatus 1300 is excluded from the target of the flat-rate service, it is made possible to update the firmware of the third image forming apparatus 1300 at arbitrary timing.

<Processing That is Performed at the Time of Withdrawal From Flat-Rate Service>

Figure 14:
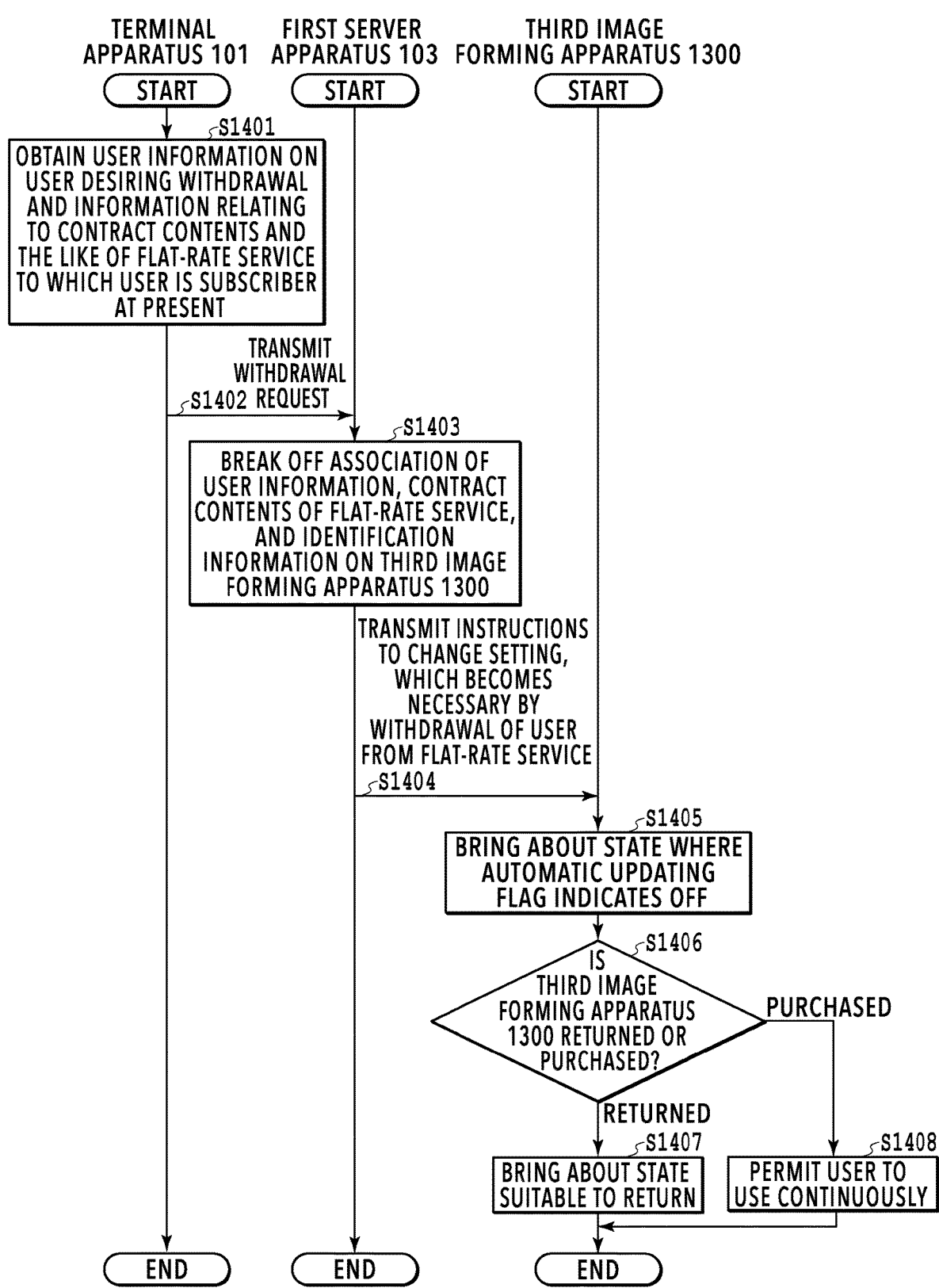
FIG. 14 is a flowchart showing one example of processing to be perform at the time of the withdrawal from the flat-rate service in one embodiment.

FIG. 14 is a flowchart showing one example of processing that is performed at the time of withdrawal from the flat-rate service in the information processing system of the present embodiment. In FIG. 14, explanation is given by supposing a case where the target of the flat-rate service is not consumables but the third image forming apparatus 1300.

Further, as the premise of the execution of the present flowchart, in the first server apparatus 103, identification information for uniquely specifying the third image forming apparatus 1300, which is the target of the flat-rate service, is stored in advance.

At S1401, the terminal apparatus 101 obtains user information on a user who desires to withdraw from the flat-rate service and information relating to the contract contents and the like of the flat-rate service to which the user is the subscriber at present. Specifically, information indicating whether the third image forming apparatus 1300 is returned or purchased by a user after the user withdraws from the flat-rate service is obtained. In a case of completing the processing at this step, the terminal apparatus 101 performs the processing at S1402.

At S1402, the terminal apparatus 101 transmits a withdrawal request including the above-described user information, the above-described contract contents and the like to the first server apparatus 103. In the request, information indicating whether the third image forming apparatus 1300 is returned or purchased is included. In a case of receiving the withdrawal request correctly, the first server apparatus 103 performs the processing at S1403. In the following, explanation is given by supposing a case where the service provider admits the above-described withdrawal of the user from the flat-rate service.

At S1403, the first server apparatus 103 breaks off the association of the above-described user information, the contract contents of the above-described flat-rate service to which the user is the subscriber, and the identification information on the third image forming apparatus 1300. In a case of completing the processing at this step, the first server apparatus 103 performs the processing at S1404.

At S1404, the first server apparatus 103 transmits setting change instructions including the setting change that becomes necessary by the withdrawal of the user from the flat-rate service to the third image forming apparatus 1300. In the instructions, the identification information on the third image forming apparatus 1300 and information indicating that the user is no longer the subscriber to the above-described flat-rate service after the processing at this step is completed are included. In the information, information indicating whether the user returns or purchases the third image forming apparatus 1300, which has been the target of the flat-rate service, is included. In a case of correctly receiving the instructions, the third image forming apparatus 1300 performs the processing at S1405.

At S1405, in the third image forming apparatus 1300, the state of the automatic updating flag is changed to the state indicating off accompanying the withdrawal from the flat-rate service and the purchase of the third image forming apparatus 1300. In a case of completing the processing at this step, the image forming apparatus 104 performs the processing at S1406.

At S1406, the image forming apparatus 104 determines whether the third image forming apparatus 1300 is returned or purchased based on the information received at S1404. In a case where the third image forming apparatus 1300 is returned (returned at S1406), the third image forming apparatus 1300 performs the processing at S1407. On the other hand, in a case where the third image forming apparatus 1300 is purchased (purchased at S1406), the third image forming apparatus 1300 performs the processing at S1408.

At S1407, the third image forming apparatus 1300 performs the processing for bringing about the state suitable to the return to the service provider. Specifically, the ejection port surface (not shown schematically) of the print head is capped. By the processing such as this being performed, it is possible to suppress ink from flowing out to the outside in a case where the third image forming apparatus 1300 is returned. As described above, in a case where it is possible to bring about the state suitable to the delivery at the time of the return for each apparatus, the processing to fix the movable portion of the third image forming apparatus 1300 may be performed. According to the configuration such as this, it is possible to suppress the third image forming apparatus 1300 from moving in returning the third image forming apparatus 1300.

In a case where the processing at S1405 is not performed and the automatic updating flag is not set to off, there is a possibility that the automatic updating processing of the firmware shown in FIG. 7 and FIG. 8 is performed. However, in a case where a user returns the third image forming apparatus 1300, the automatic updating of the firmware may not be performed. Because of this, bringing about the state where the automatic updating flag indicates off at S1405 is useful for the user.

Further, the processing for deactivating the basic function (for example, printing operation and the like) of the third image forming apparatus 1300 may be performed.

Furthermore, at this step, other than the above-described processing, processing for restricting the operation of the third image forming apparatus 1300 may be performed. For example, the processing for deactivating the automatic power-on function described above by using FIG. 4 may be performed. Processing for forcibly activating or deactivating the automatic power-off function may be performed. Processing for deactivating the schedule-on function may be performed. Processing for deactivating the information notification setting may be performed. Specifically, Processing for disconnecting the communication of the third image forming apparatus 1300 may be performed. The reason is that it is not necessary to allow a user to utilize the third image forming apparatus 1300 in a case where the user withdraws from the flat-rate service and returns the third image forming apparatus 1300.

After performing the processing at S1407, the third image forming apparatus 1300 terminates the processing of the present flowchart.

At S1408, the third image forming apparatus 1300 performs processing for permitting a user to continuously utilize the third image forming apparatus 1300. That is, processing for causing the third image forming apparatus 1300, which has been the target of the flat-rate service, to operate as the general product on the market is performed. For example, processing for enabling the printing operation of the third image forming apparatus 1300 even in a case where the third image forming apparatus 1300 is replenished with ink on the market, not the ink delivered by the flat-rate service, is performed. As described above, at this step, the necessary processing is performed for each apparatus. After performing the processing at this step, the third image forming apparatus 1300 terminates the processing of the present flowchart.

The above is the explanation of the processing that is performed at the time of withdrawal from the flat-rate service in the present embodiment. After the present flowchart is completed, the automatic updating flag indicates off. However, a user may be permitted to bring about the state where the automatic updating flag indicates on by activating the automatic updating function via the "automatic updating setting" on the "setting screen" on the display unit 408 (see FIG. 4).

Conclusion

As explained above, according to the system of the present embodiment, while the third image forming apparatus 1300 remains the target of the flat-rate service, the automatic updating flag of the predetermined program is activated without fail. Due to this, in the third image forming apparatus 1300, the predetermined program of the most recent version is installed automatically. Consequently, it is made possible for a user to receive the flat-rate service utilizing the predetermined program of the most recent version. On the other hand, it is made possible for the service provider to keep the quality of the service to be provided to a user.

Then, after a user withdraws from the flat-rate service, the automatic updating flag of the information processing apparatus indicates off. Due to this, the predetermined program is no longer installed automatically in the information processing apparatus. Consequently, in a case where the third image forming apparatus 1300 is the target of the flat-rate service, in the information processing apparatus in the present embodiment, the automatic updating function of the predetermined program is set to on without fail by the product-arrival sequence. That is, unless the user intentionally changes the automatic updating flag, the predetermined program is updated automatically.

Consequently, according to the information processing apparatus in the present embodiment, it is possible to automatically update the predetermined program more securely than before in a case where the flat-rate service is utilized.

Further, in a case where the information processing apparatus that has been the target of the flat-rate service is excluded from the target of the flat-rate service, the automatic updating function of the predetermined program is set to off. Consequently, unless the user intentionally changes the automatic updating flag, the predetermined program is no longer updated automatically. According to the configuration such as this, in a case where the third image forming apparatus 1300 that has been the target of the flat-rate service is returned, it is possible to suppress the predetermined program from being updated at timing not necessary for a user.

Further, in a case where the third image forming apparatus 1300 that has been the target of the flat-rate service is purchased by a user, it is made possible to flexibly switch between activation and deactivation of the automatic updating function of the predetermined program.

Other Embodiments

In the above embodiments, the first server apparatus and the second server apparatus are respectively external apparatuses different from each other. However, the first server apparatus and the second server apparatus may be one external apparatus comprising the functions of the first server apparatus and the second server apparatus.

At S602 described above, by using the initial setting flag, whether or not the sequence currently being performed is the product-arrival sequence is determined. However, as long as it is possible to determine whether or not the sequence currently being performed is the product-arrival sequence, it may also be possible to perform the determination by using information other than the initial setting flag.

Further, in the explanation of the above embodiments, the state of the flag is described as "on" or "off", but the state of the flag may be represented by "0 (number zero)" or "1".

Furthermore, in the above embodiments, the setting relating to the updating of the firmware is changed via the display unit of the third image forming apparatus 1300. However, as long as it is possible to change the setting, the change of the setting may be reflected in the third image forming apparatus 1300 by transmitting instructions to change the setting from the terminal apparatus 101 that can be connected to the third image forming apparatus 1300, or another external terminal.

At S701 described above, the time during which a user does not operate the image forming apparatus 104 is counted, but as long as it is possible to make an attempt to update the firmware, the counted time is not limited to the time during which the image forming apparatus 104 is not operated.

At S702 described above, as one example of the time during which a user does not operate the image forming apparatus 104, ten minutes are given. However, the time is not limited to ten minutes.

At S705 described above, the second server apparatus 105 transmits information relating to the most recent firmware to the image forming apparatus 104. The information may be encrypted by the second server apparatus 105. In this case, the image forming apparatus 104 obtains the information by decrypting the received information.

At S703 described above, the identification information for uniquely specifying the image forming apparatus 104 is transmitted to the second server apparatus 105. The identification information may be transmitted at S708, not transmitted at S703.

In this case, at S709, the second server apparatus 105 specifies the most recent firmware that can be installed in the image forming apparatus 104. Then, the most recent firmware is transmitted to the image forming apparatus 104.

At S709 described above, the most recent firmware is transmitted to the image forming apparatus 104 from the second server apparatus 105. The most recent firmware may be encrypted by the second server apparatus 105. In this case, the image forming apparatus 104 decrypts the received most recent firmware. Then, by using the decrypted most recent firmware, the updating of the firmware is performed. In a case where the firmware is updated by this processing, based on the completion of the updating of the firmware, the image forming apparatus 104 may be rebooted.

At S807 described above, the CPU 401 does not transmit information to the second server apparatus 105 (see FIG. 7). However, it may also be possible to transmit instructions for aborting the transmission of the most recent firmware to the second server apparatus 105 (see FIG. 7). Then, the transmission of the most recent firmware may be aborted by the CPU 501 (see FIG. 5) of the second server apparatus 105 having received the instructions.

In the example in FIG. 11, the second image forming apparatus 902 receives the instructions for dealing with the flat-rate service from the first server apparatus 103. As another example of this, the instructions for dealing with the flat-rate service may be transmitted to the second image forming apparatus 902 from the first server apparatus 103 via the terminal apparatus 101. In this case, the terminal apparatus 101 receives information including the contract contents of the contracted flat-rate service from the first server apparatus 103. Then, the instructions for dealing with the flat-rate service are transmitted to the second image forming apparatus 902 via the software, the application or the like of the terminal apparatus 101.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the information processing apparatus of the present invention, it is possible to automatically update a predetermined program more securely than before.

This application claims the benefit of Japanese Patent Applications No. 2023-012104, filed Jan. 30, 2023 and No. 2023-149206, filed Sep. 14, 2023 which are hereby incorporated by reference wherein in their entirety.

What is claimed is:

1. An information processing apparatus comprising:

one or more memories storing firmware and storing a predetermined program; and one or more processors that, upon execution of the predetermined program, perform the functions of:

a communication control unit capable of communicating with an external apparatus mutually;

an automatic updating unit capable of, in a case where a most recent firmware corresponding to the stored firmware is stored in the external apparatus, automatically updating the stored firmware in the information processing apparatus to the most recent firmware by receiving the most recent firmware from the external apparatus; and a setting unit configured to perform setting for activating or deactivating the automatic updating unit, wherein in a case where the information processing apparatus is not a target of a predetermined subscription service, the setting unit performs displaying to allow a user to select activating or deactivating the automatic updating unit for the firmware in the information processing apparatus, and in a case where the information processing apparatus is the target of the predetermined subscription service, the setting unit activates the automatic updating unit without performing the displaying.

2. The information processing apparatus according to claim 1, wherein in a case where the information processing apparatus is not the target of the predetermined subscription service, the setting unit performs setting for activating and deactivating the automatic updating unit based on a selection by the user in relation to the displaying.

3. The information processing apparatus according to claim 1, wherein in a case where the information processing apparatus is the target of the predetermined subscription service, the setting unit does not perform setting for activating and deactivating the automatic updating unit at a point of time at which a power supply of the information processing apparatus is turned on for the first time.

4. The information processing apparatus according to claim 1, wherein the one or more processors further cause the setting unit to perform the functions of a display unit configured to display a screen for selecting activation or deactivation of the automatic updating unit.

5. The information processing apparatus according to claim 4, wherein a button for selecting whether or not to automatically update the firmware is displayed.

6. The information processing apparatus according to claim 1, wherein in a case where a standby state in the information processing apparatus continues for a predetermined time, the firmware is updated automatically to the most recent firmware.

7. The information processing apparatus according to claim 1, wherein the one or more processors further perform the function of:

a decryption unit configured to decrypt the most recent firmware if it is encrypted.

8. The information processing apparatus according to claim 1, wherein the information processing apparatus is configured so that setting of the automatic updating unit is permitted in a case where a consumable capable of being used for the information processing apparatus is a target of a predetermined subscription service.

9. The information processing apparatus according to claim 1, wherein the setting unit performs setting for deactivating the automatic updating unit in a case of obtaining information indicating that the information processing apparatus is not a target of the predetermined subscription service.

10. The information processing apparatus according to claim 9, wherein the setting unit performs setting for deactivating the automatic updating unit in a case of obtaining information indicating that the information processing apparatus is returned from a user to a service provider.

11. The information processing apparatus according to claim 10, wherein in a state where the automatic updating unit is deactivated, operations are restricted.

12. The information processing apparatus according to claim 9, wherein the setting unit performs setting for deactivating the automatic updating unit in a case of obtaining information indicating that the information processing apparatus is purchased by a user.

13. The information processing apparatus according to claim 9, wherein in a case where the information processing apparatus that was excluded from being the target of the predetermined subscription service becomes the target of the predetermined subscription service again, the automatic updating unit is in an activated state and the setting unit does not perform setting for activating and deactivating the automatic updating unit.

14. A control method of an information processing apparatus, the control method comprising:

automatically updating, by automatically receiving a most recent firmware from an external apparatus, a stored firmware stored in a memory to the most recent firmware; and setting whether or not to permit execution of the automatic updating, wherein in a case where the information processing apparatus is not a target of a predetermined subscription service, the setting comprises displaying a display to allow a user to select activating or deactivating automatic updating of the stored firmware in the information processing apparatus, and in a case where the information processing apparatus is the target of the predetermined subscription service, the setting comprises activating the automatic updating without performing the displaying.

15. A non-transitory computer readable storage medium storing a program for causing a computer to perform a control method of an information processing apparatus, the control method comprising:

storing a predetermined firmware;

communicating with an external apparatus mutually;

automatically updating, in a case where a most recent firmware corresponding to the stored firmware is stored in the external apparatus, the stored firmware to the most recent firmware by receiving the most recent firmware from the external apparatus; and setting activation or deactivation of the automatic updating, wherein in a case where the information processing apparatus is not a target of a predetermined subscription service, the setting comprises displaying a display to allow a user to select activation or deactivating the automatic updating of the stored firmware in the information processing apparatus, and in a case where the information processing apparatus is the target of the predetermined subscription service, the setting comprises activating the automatic updating without performing the displaying.

16. The information processing apparatus according to claim 1, wherein in a case where a switch is made from a state in which the information processing apparatus is the target of the predetermined subscription service to a state in which the information processing apparatus is not the target of the predetermined subscription service, the automatic updating unit of the stored firmware in the information processing apparatus is switched from activated to deactivated.

* * * * *